US010999478B2

(12) United States Patent
Takei et al.

(10) Patent No.: US 10,999,478 B2
(45) Date of Patent: May 4, 2021

(54) IMAGE PROCESSING APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventors: Tomohiko Takei, Kanagawa (JP); Koichi Matsubara, Kanagawa (JP); Yuma Motegi, Kanagawa (JP); Kazuhiko Horikawa, Kanagawa (JP); Ryosuke Yonesaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/522,741

(22) Filed: Jul. 26, 2019

(65) Prior Publication Data
US 2020/0304689 A1    Sep. 24, 2020

(30) Foreign Application Priority Data

Mar. 22, 2019   (JP) .............................. JP2019-054858

(51) Int. Cl.
*H04N 1/46*   (2006.01)
*H04N 1/62*   (2006.01)
*H04N 1/00*   (2006.01)

(52) U.S. Cl.
CPC ........... *H04N 1/62* (2013.01); *H04N 1/00023* (2013.01); *H04N 1/00037* (2013.01); *H04N 1/00063* (2013.01); *H04N 1/00084* (2013.01)

(58) Field of Classification Search
None
See application file for complete search history.

(56) References Cited

U.S. PATENT DOCUMENTS

| 5,486,901 | A  | * | 1/1996  | Fukuchi   | G03G 15/01  |
|           |    |   |         |           | 399/40      |
| 6,148,168 | A  | * | 11/2000 | Hirai     | H04N 1/506  |
|           |    |   |         |           | 399/231     |
| 9,665,027 | B2 | * | 5/2017  | Matsuoka  | G03G 15/01  |
| 2008/0159763 | A1 | * | 7/2008  | Nakane  | G03G 15/5062 |
|           |    |   |         |           | 399/49      |
| 2009/0147289 | A1 | * | 6/2009  | Fujita  | H04N 1/60   |
|           |    |   |         |           | 358/1.9     |

(Continued)

FOREIGN PATENT DOCUMENTS

| JP | 2004-351721 A | 12/2004 |
| JP | 5397759 B2    | 1/2014  |

*Primary Examiner* — Cheukfan Lee
(74) *Attorney, Agent, or Firm* — Sughrue Mion, PLLC

(57) ABSTRACT

An image processing apparatus includes a receiver and a correcting unit. The receiver receives a first read value and a second read value. The first read value indicates a result of reading a first color by a reader from a recording medium in which the first color is applied to a first area in which in-plane density unevenness is confirmable within the recording medium. The second read value indicates a result of reading a second color by the reader. The second color is different from the first color and is applied to a second area that is substantially the same as the first area in a superimposed manner. The correcting unit corrects in-plane density unevenness of the second color applied to the first color in the superimposed manner based on the first read value received by the receiver and the second read value received by the receiver.

16 Claims, 17 Drawing Sheets

(56) References Cited

U.S. PATENT DOCUMENTS

| | | | |
|---|---|---|---|
| 2011/0158668 A1* | 6/2011 | Fuse | G03G 15/1605 399/49 |
| 2013/0136474 A1* | 5/2013 | Itagaki | G03G 15/2039 399/49 |
| 2013/0250318 A1* | 9/2013 | Takahashi | G03G 15/5062 358/1.9 |
| 2013/0286442 A1* | 10/2013 | Nishida | H04N 1/6047 358/3.27 |
| 2016/0274521 A1* | 9/2016 | Iwata | G03G 15/043 |
| 2017/0269517 A1* | 9/2017 | Ikeda | G03G 15/6585 |
| 2018/0099510 A1* | 4/2018 | Niino | B41J 2/04588 |
| 2020/0096915 A1* | 3/2020 | Hashimoto | G03G 15/0189 |

* cited by examiner

FIG.11

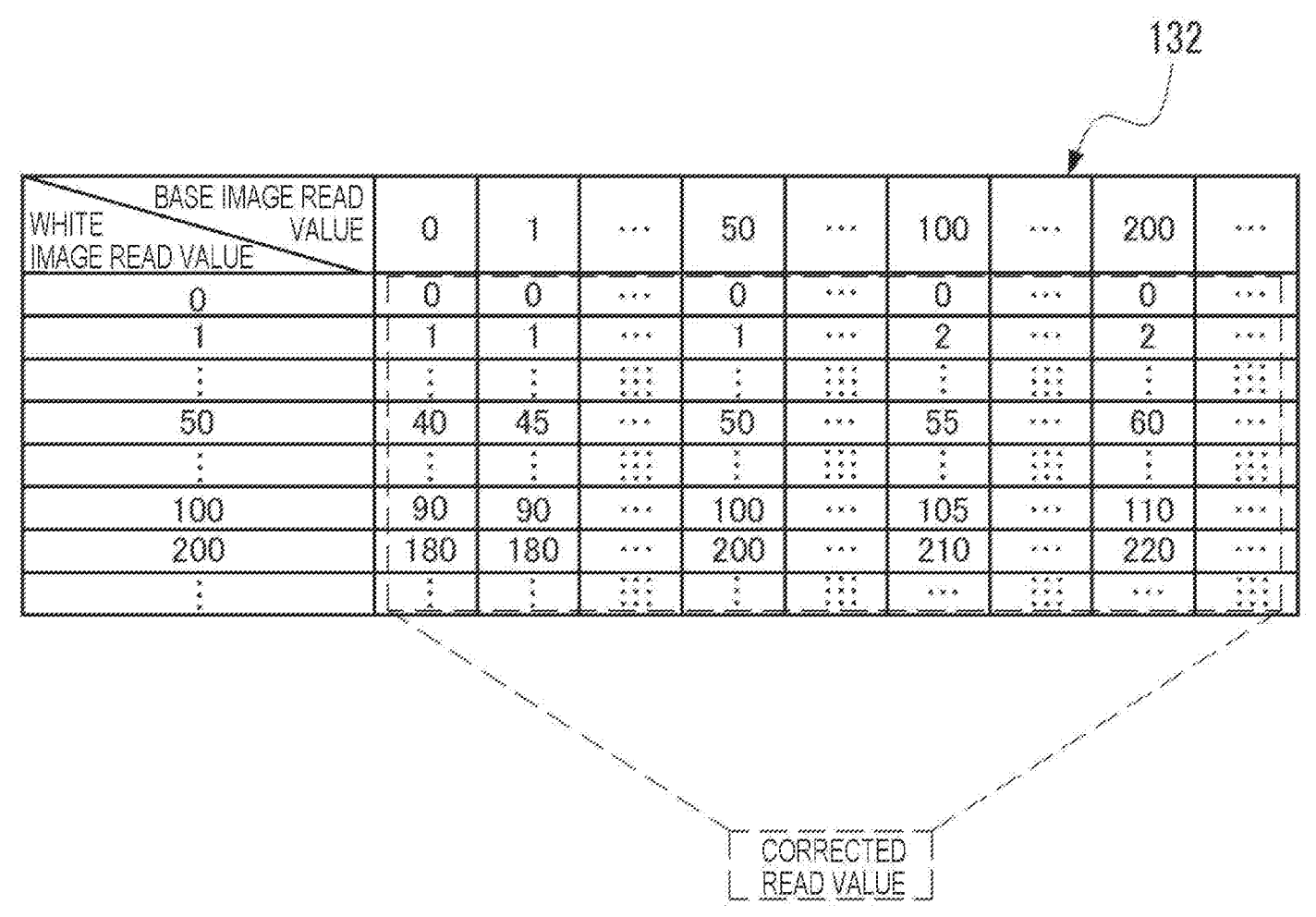

| WHITE IMAGE READ VALUE \ BASE IMAGE READ VALUE | 0 | 1 | ... | 50 | ... | 100 | ... | 200 | ... |
|---|---|---|---|---|---|---|---|---|---|
| 0 | 0 | 1 | ... | 0 | ... | 0 | ... | 0 | ... |
| 1 | 1 | 1 | ... | 1 | ... | 2 | ... | 2 | ... |
| ... | ... | ... | ... | ... | ... | ... | ... | ... | ... |
| 50 | 40 | 45 | ... | 50 | ... | 55 | ... | 60 | ... |
| ... | ... | ... | ... | ... | ... | ... | ... | ... | ... |
| 100 | 90 | 90 | ... | 100 | ... | 105 | ... | 110 | ... |
| 200 | 180 | 180 | ... | 200 | ... | 210 | ... | 220 | ... |
| ... | ... | ... | ... | ... | ... | ... | ... | ... | ... |

132 → CORRECTED READ VALUE

FIG.16
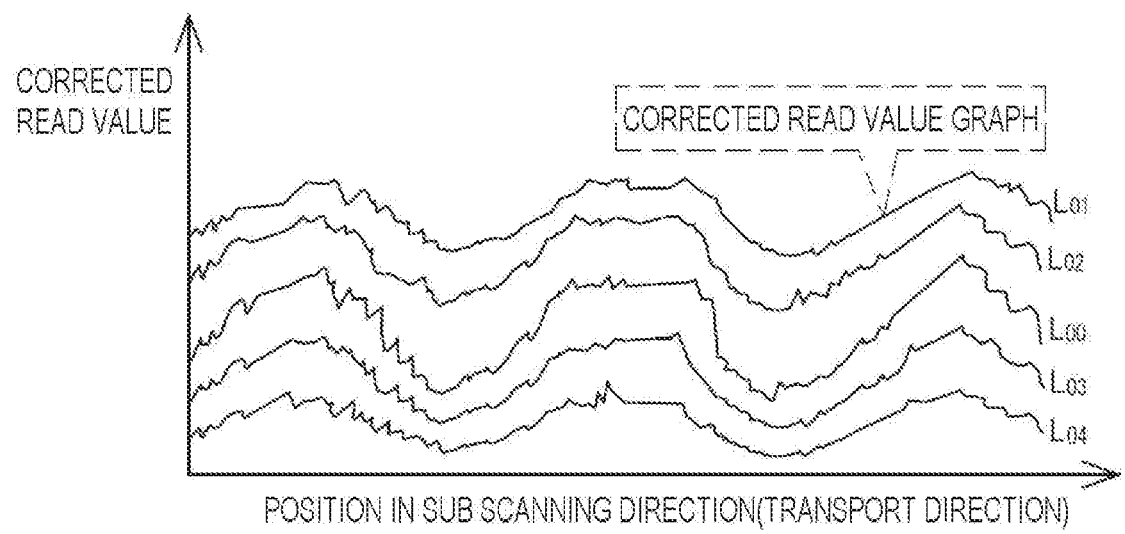
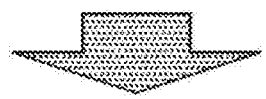
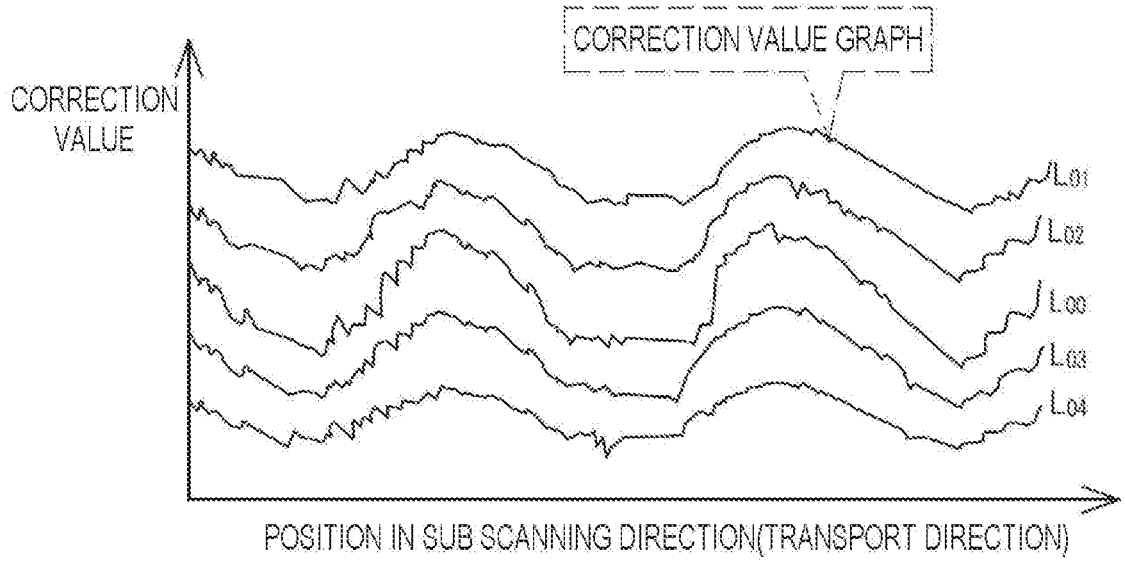

IMAGE PROCESSING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-054858 filed Mar. 22, 2019.

BACKGROUND

(i) Technical Field

The technology of the present disclosure relates to an image processing apparatus, an image forming apparatus, and a non-transitory computer readable medium.

(ii) Related Art

JP-B-5397759 discloses an image forming apparatus including a test image forming unit, a density detecting unit, at least one determination unit among a tone determination unit, an unevenness determination unit, or a remaining amount determination unit, a selection unit, a measurement image forming unit. The test image forming unit forms, on an intermediate transfer body, a test image using plural image forming materials having predetermined colors. The density detecting unit detects a density of the test image. The tone determination unit determines a tone of the test image based on a density measurement value detected by the density detecting unit. The unevenness determination unit determines an unevenness of the density of the test image based on a density measurement value detected by the density detecting unit. The remaining amount determination unit determines remaining amounts of the image forming materials used in the test image formed on the intermediate transfer body. The selection unit selects a specific color based on a determination result of the at least one of the tone determination unit, the unevenness determination unit, or the remaining amount determination unit. The measurement image forming unit forms a base image using the specific color selected by the selection unit, and forms a measurement image while superimposing on the base image. The measurement image is an image for use in control to form an image of a color different from the base image. The selection unit selects the color meeting at least one condition of (i) a tone of a predetermined condition, (ii) a density unevenness of a predetermined condition, or (iii) a remaining amount of an image forming material of a predetermined condition. When there is no color meeting at least one condition of (i) the tone of the predetermined condition, (ii) the density unevenness of the predetermined condition, or (iii) the remaining amount of the image forming material of the predetermined condition, the selection unit selects plural colors and uses, as a base image, an image in which the plural colors are superimposed on each other.

JP-A-2004-351721 discloses a printing apparatus including a first storage, a second storage, a density correction data generator, and a correction unit. The first storage stores correction data for light amount variations of dots constituting a print head. The second storage stores correction data for a charge variation on a photoconductor. The density correction data generator reads the correction data stored in the first and second storages, and generates density correction data. The correction unit corrects print data in accordance with the density correction data, and corrects a light amount of each dot of the print dot.

SUMMARY

Aspects of non-limiting embodiments of the present disclosure relate to an image processing apparatus, an image forming apparatus, and a non-transitory computer readable medium that can correct, with high accuracy, in-plane density unevenness of a second color when the second color different from a first color is applied to the first color in a superimposed manner as compared with a case of correcting the in-plane density unevenness of the second color without considering density unevenness of the first color when the second color different from the first color is applied to the first color in a superimposed manner.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including: a receiver configured to receive a first read value indicating a result of reading a first color by a reader from a recording medium in which the first color is applied to a first area in which in-plane density unevenness is confirmable within the recording medium, and a second read value indicating a result of reading a second color by the reader, the second color being different from the first color and being applied to a second area that is substantially the same as the first area in a superimposed manner; and a correcting unit configured to correct in-plane density unevenness of the second color applied to the first color in the superimposed manner based on the first read value received by the receiver and the second read value received by the receiver.

BRIEF DESCRIPTION OF THE DRAWINGS

Exemplary embodiments of the present invention will be described in detail based on the following figures, wherein:

FIG. 11 is a conceptual diagram illustrating an example of read value correction information according to the exemplary embodiment:

FIG. 16 is an explanatory diagram of assistance in explaining a method of creating a correction value graph from the corrected read value graph according to the exemplary embodiment.

DETAILED DESCRIPTION

Hereinafter, an example of an exemplary embodiment of an image processing apparatus, an image forming apparatus, and a non-transitory computer readable medium according to the technology of the present disclosure will be described with reference to the accompanying drawings.

First, the meanings of terms used in the following description will be described.

"CPU" refers to the abbreviation for "Central Processing Unit". "RAM" is the abbreviation for "Random Access Memory". "ROM" is the abbreviation for "Read Only Memory". "GPU" refers to the abbreviation for "Graphic Processing Unit". "I/F" refers to the abbreviation for "Interface". "I/O" is the abbreviation for "Input Output Interface". "FFT" refers to the abbreviation for "Fast Fourier Transform".

"SSD" refers to the abbreviation for "Solid State Drive". "USB" refers to the abbreviation for "Universal Serial Bus". "HDD" refers to the abbreviation for "Hard Disk Drive". "EEPROM" refers to the abbreviation for "Electrically Erasable and Programmable Read Only Memory". "CD" refers to the abbreviation for "Compact Disk". "DVD" refers to the abbreviation for "Digital Versatile Disc". "CCD" refers to the abbreviation for "Charge Coupled Device". "CMOS" refers to the abbreviation for "Complementary Metal Oxide Semiconductor". Further, "EL" is the abbreviation for "Electro-Luminescence".

"ASIC" refers to the abbreviation for "Application Specific Integrated Circuit". Further, in the following description, "PLD" refers to the abbreviation for "Programmable Logic Device". Further, in the following description, "FPGA" refers to the abbreviation for "Field-Programmable Gate Array". "SoC" refers to the abbreviation for "System-on-a-Chip".

Figure 1:
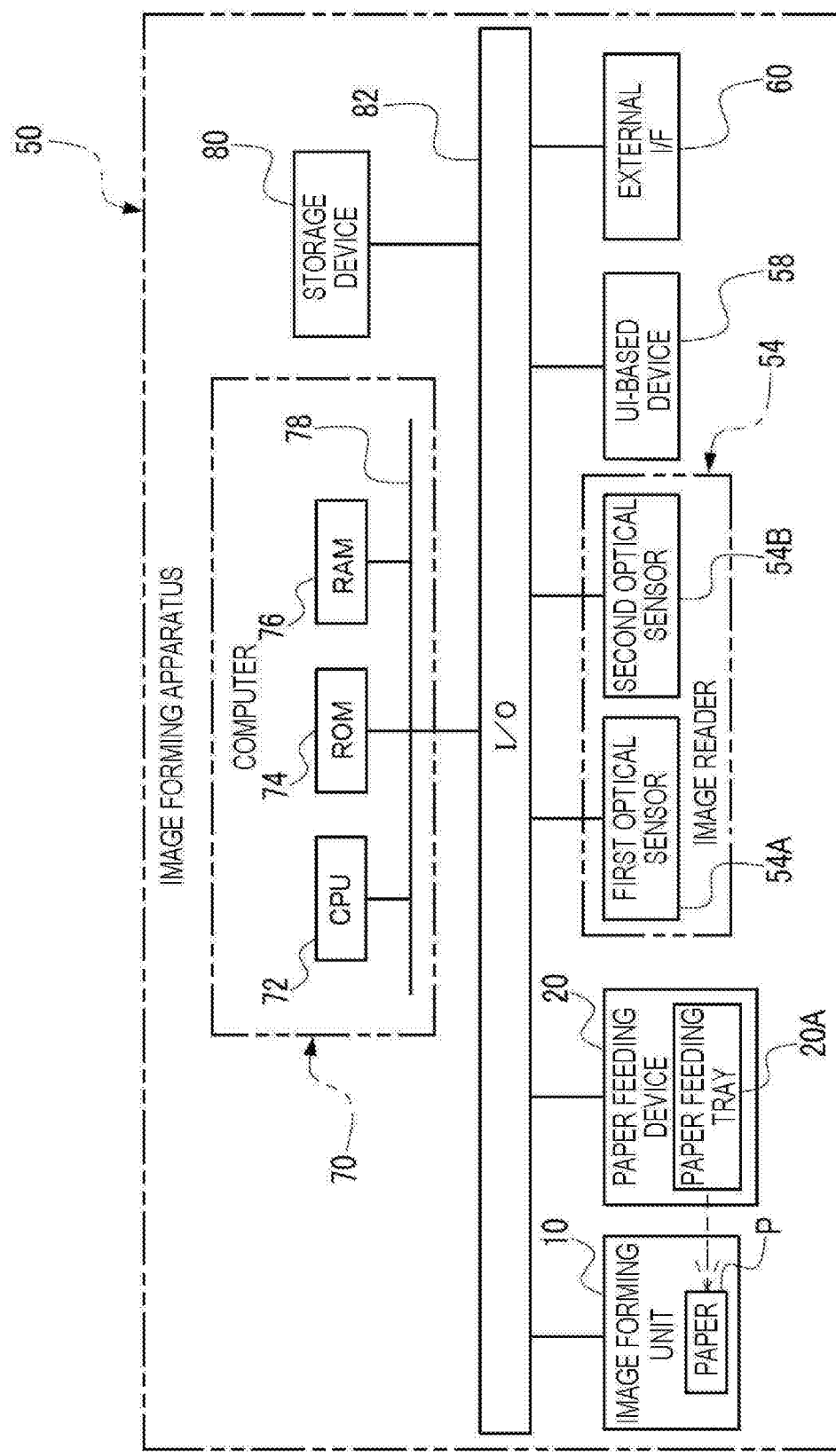
FIG. 1 is a block diagram illustrating an example of a configuration of an image forming apparatus according to an exemplary embodiment.

As illustrated in FIG. 1 as an example, the image forming apparatus 50 includes an image forming unit 10, a paper feeding device 20, an image reader 54, a UI-based device 58, an external I/F 60, a computer 70, a storage device 80, and an I/O 82.

The computer 70 is an example of an "image processing apparatus" and a "computer" according to the technology of the present disclosure. The computer 70 includes a CPU 72, a ROM 74, and a RAM 76. The CPU 72, the ROM 74, and the RAM 76 are mutually connected via a bus line 78.

The ROM 74 stores various programs. The CPU 72 reads the various programs from the ROM 74, and develops the read various programs into the RAM 76. The CPU 72 controls the entire image forming apparatus 50 according to the various programs developed in the RAM 76.

The I/O 82 includes input and output ports (not illustrated). Connected to the I/O 82 are the image forming unit 10, the paper feeding device 20, the image reader 54, the UI-based device 58, the external I/F 60, the computer 70, and the storage device 80 via the input and output ports. The I/O 82 is connected to the bus line 78, and the CPU 72 performs exchange of various pieces of information with each of the image forming unit 10, the paper feeding device 20, the image reader 54, the UI-based device 58, the external I/F 60, and the storage device 80 via the I/O 82.

The paper feeding device 20 includes a paper feeding tray 20A. Paper P is accommodated in the paper feeding tray 20A. The paper P is an example of a "recording medium" according to the technology of the present disclosure. The paper feeding device 20 takes out the paper P from the paper feeding tray 20A and supplies the taken-out paper P to the image forming unit 10 under the control of the CPU 72. The image forming unit 10 forms an image on the paper P supplied from the paper feeding device 20.

The image reader 54 includes a first optical sensor 54A and a second optical sensor 54B. The image reader 54 is an example of a "reader" according to the technology of the present disclosure. Each of the first optical sensor 54A and the second optical sensor 54B is a one-dimensional line sensor having a CCD image sensor. Each of the first optical sensor 54A and the second optical sensor 54B is connected to the I/O 82, and optically reads the image formed by the image forming unit 10 and outputs a read value which is the read result to the CPU 72 under the control of the CPU 72. The term "read value" as used herein refers to, for example, a tone value that indicates the tone of an image.

In addition, the CCD image sensor is illustrated here, but the technology of the present disclosure is not limited thereto, and another image sensor such as a CMOS image sensor may be applied. Further, the one-dimensional line sensor is illustrated here, but the technology of the present disclosure is not limited thereto, and a two-dimensional sensor may be applied.

The UI-based device 58 includes a display (not illustrated) and a receiving device (not illustrated). The display displays, for example, an image under the control of the CPU 72. An example of the display may be a liquid crystal display. The display may not be a liquid crystal display, but may be another display such as an organic EL display. The receiving device includes a touch panel and a hard key, for example, and receives various instructions from a user, and the CPU 72 operates in response to the various instructions received by the receiving device.

The external I/F 60 is a communication device having an FPGA. The external I/F 60 is connected to an external device (not illustrated) such as a personal computer, a USB memory, an external SSD, an external HDD, an EEPROM, and a memory card. The external I/F 60 is responsible for exchange of various pieces of information between the CPU 72 and the external device. The storage device 80 is a non-volatile memory such as an SSD, an HDD, or an EEPROM, and the CPU 72 reads and writes various pieces of information from and to the storage device 80.

Image information indicating an image is given from the computer 70 to the image forming unit 10, and the image forming unit 10 forms an image indicated by the image information given from the computer 70 on the paper P. The image forming unit 10 forms an image by transferring at least one of five color toners of yellow (Y), magenta (M), cyan (C), black (K), or white (W) onto the paper P and fixing the transferred toner to the paper P.

Figure 2:
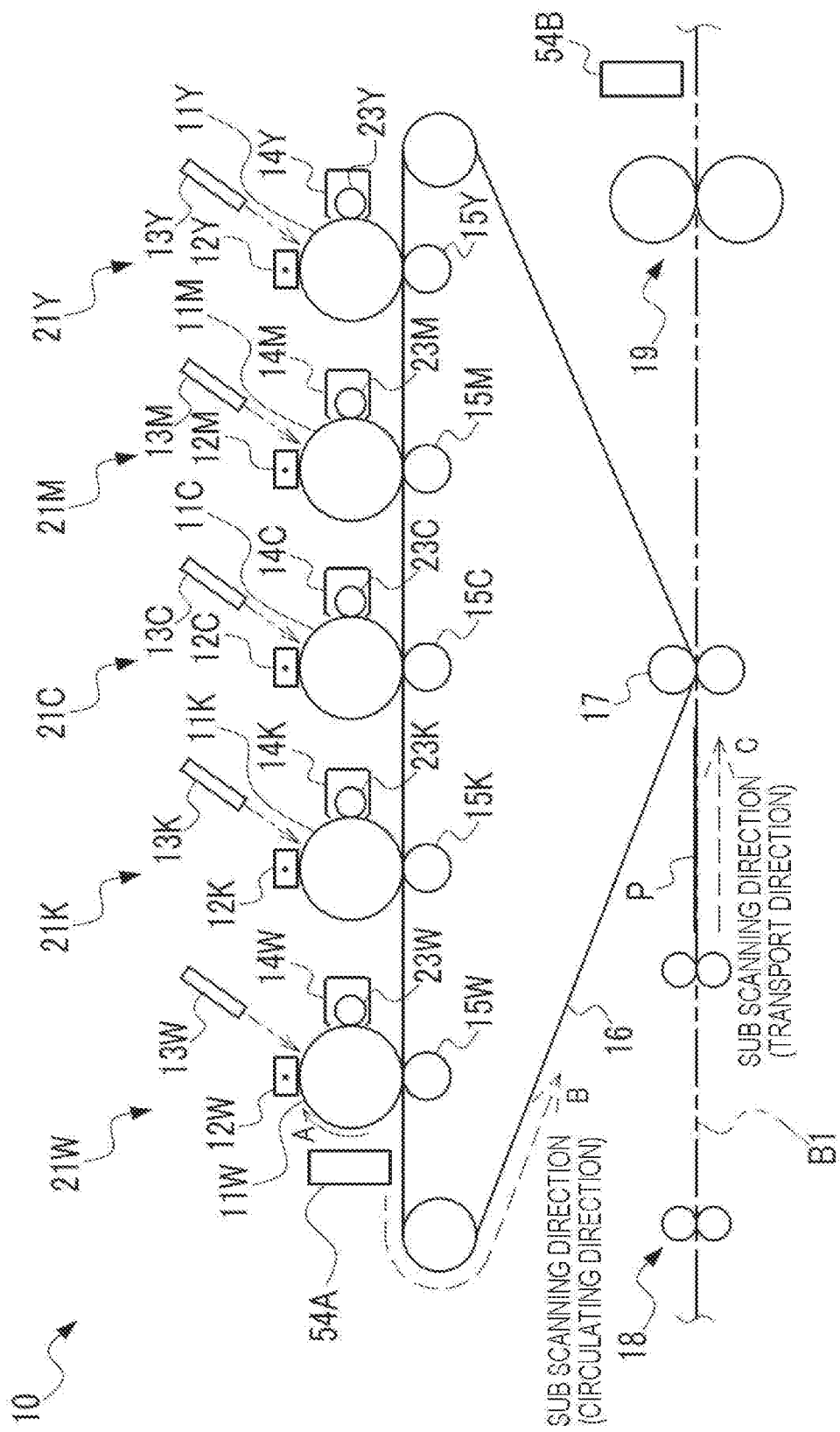
FIG. 2 is a schematic side view illustrating an example of configurations of an image forming unit and an image reader of the image forming apparatus according to the exemplary embodiment.

As illustrated in FIG. 2 as an example, the image forming unit 10 includes an image forming unit 21Y, an image forming unit 21M, an image forming unit 21C, an image forming unit 21K, an image forming unit 21W, an intermediate transfer belt 16, a secondary transfer unit 17, a transport unit 18, and a fixing unit 19.

In addition, in the example illustrated in FIG. 2, by adding the alphabet of Y, M, C, K, or W to the end of the reference numeral of a member, it is indicated that the member with the alphabet attached to the end of the reference numeral is a member involved in the formation of a color image corresponding to the alphabet of the end of the reference numeral. Hereinafter, for convenience of explanation, when it is not necessary to distinguish between the colors of Y, M, C, K, and W, the alphabet attached to the end of the reference numeral of the member will be omitted.

The image forming unit 21Y, the image forming unit 21M, the image forming unit 21C, the image forming unit 21K, and the image forming unit 21W are disposed along a circulating direction B of the intermediate transfer belt 16. Specifically, the image forming unit 21Y, the image forming unit 21M, the image forming unit 21C, the image forming unit 21K, and the image forming unit 21W are disposed in this order from the upstream side to the downstream side in the circulating direction of the intermediate transfer belt 16.

The image forming unit 21 includes a photoconductor drum 11, a charger 12, an exposure unit 13, a developing unit 14, and a primary transfer roller 15. The charger 12, the exposure unit 13, the developing unit 14, and the primary transfer roller 15 are disposed along the circumferential direction of the photoconductor drum 11.

The photoconductor drum 11 has a photosensitive layer on the side peripheral surface of a cylindrical member. An electrostatic latent image is formed on the surface of the photosensitive layer in a state where the photoconductor drum 11 is rotated in a rotational direction A which is the circumferential direction of the photoconductor drum 11, and a toner is applied to the electrostatic latent image. The photoconductor drum 11 holds an image formed by applying a toner to the electrostatic latent image to develop the electrostatic latent image.

The charger 12 charges the photosensitive layer of the photoconductor drum 11. The exposure unit 13 exposes the photosensitive layer by irradiating the charged photosensitive layer with light. In this case, the exposure unit 13 controls the intensity of light and the irradiation position according to the image information given from the computer 70. Thus, an electrostatic latent image representing an image indicated by the image information given from the computer 70 is formed on the photoconductor drum 11. The developing unit 14 includes a developing roller 23. The developing roller 23 adsorbs and transports a charged toner. The development of the electrostatic latent image is realized by applying a developing bias voltage to the photoconductor drum 11 and the developing roller 23 to transfer the toner from the developing roller 23 onto the photoconductor drum 11. As described above, the developing unit 14 forms, with the toner, a visualized image on the area of the surface of the photoconductor drum 11 in which the electrostatic latent image is formed.

The intermediate transfer belt 16 is a belt-shaped member that circulates in a sub scanning direction. Specifically, the intermediate transfer belt 16 is an endless belt having a black (K) surface, and holds an image primarily transferred from the photoconductor drum 11. The intermediate transfer belt 16 is rotatably supported by plural support rollers, and circulates in the circulating direction B by applying a driving force to at least one of the plural support rollers. As the intermediate transfer belt 16 circulates in the circulating direction B, images of respective colors are primarily transferred onto the intermediate transfer belt 16 in the color sequence of Y, M, C. K, and W by photoconductor drums 11Y, 11M, 11C, 1K, and 11W. The primary transfer roller 15 is disposed at a position facing the photoconductor drum 11 with the intermediate transfer belt 16 interposed therebetween. The primary transfer roller 15 is pressurized toward the surface of the photoconductor drum 11 by an urging unit (not illustrated) such as an elastic member, and the primary transfer roller 15 and the photoconductor drum 11 rotate while pushing each other with the intermediate transfer belt 16 pinched therebetween. The intermediate transfer belt 16 circulates while being sandwiched between the photoconductor drum 11 and the primary transfer roller 15.

The image held by the photoconductor drum 11 is transferred onto the intermediate transfer belt 16 by applying a primary transfer voltage to the photoconductor drum 11 and the primary transfer roller 15 in a state where the intermediate transfer belt 16 is sandwiched between the photoconductor drum 11 and the primary transfer roller 15. The secondary transfer unit 17 includes a secondary transfer roller and a backup roller. The secondary transfer roller and the backup roller face each other with the intermediate transfer belt interposed therebetween, and a nip portion is formed by the secondary transfer roller and the backup roller. The image held by the intermediate transfer belt 16 is secondarily transferred onto the paper P passing through the nip portion by applying a secondary transfer voltage to the nip portion.

The transport unit 18 includes plural rollers, and transports the paper P supplied from the paper feeding device 20 (see FIG. 1). The transport unit 18 transports the paper P in a transport direction C along a transport path B1 that passes through the nip portion. The paper P transported by the transport unit 18 comes into contact with the intermediate transfer belt 16 at the nip portion, whereby the image is secondarily transferred onto the paper P. The fixing unit 19 fixes the secondarily transferred image to the paper P. The paper P on which the image has been fixed is transported by the transport unit 18 and is discharged to the outside of the image forming apparatus 50.

As illustrated in FIG. 2 as an example, the first optical sensor 54A is disposed downstream of the image forming unit 21W in the circulating direction B, and optically reads the image held by the intermediate transfer belt 16. Further, the second optical sensor 54B is disposed downstream of the fixing unit 19 in the transport direction C, and optically reads the image formed on the paper P.

In addition, in the present exemplary embodiment, the direction in which the photoconductor drum 11 is scanned with light by the exposure unit 13 is a main scanning direction, and each of the circulating direction B of the intermediate transfer belt 16 and the transport direction C of the paper P is a sub scanning direction. Hereinafter, for convenience of explanation, when it is not necessary to distinguish between the circulating direction B of the intermediate transfer belt 16 and the transport direction C of the paper P, each direction is simply referred to as the "sub scanning direction".

By the way, in order to correct in-plane density unevenness in a white image which is an image formed only with a white (W) toner on the paper P, it is necessary to make a base color of the white image be a color other than white. For example, after forming a white image with a W toner on a colored paper other than white such as a black paper as a base of the white image, or after additionally printing a white image on a base image formed on the paper P in a color other than white, it is necessary to read the white image by the second optical sensor 54B.

However, when using the colored paper other than white as a base, it is necessary to purchase the colored paper, which may increase the cost. On the other hand, when additionally printing the white image on the base image, the white image is affected by the color of the base image and density unevenness occurs in the plane of the white image.

Figure 3:
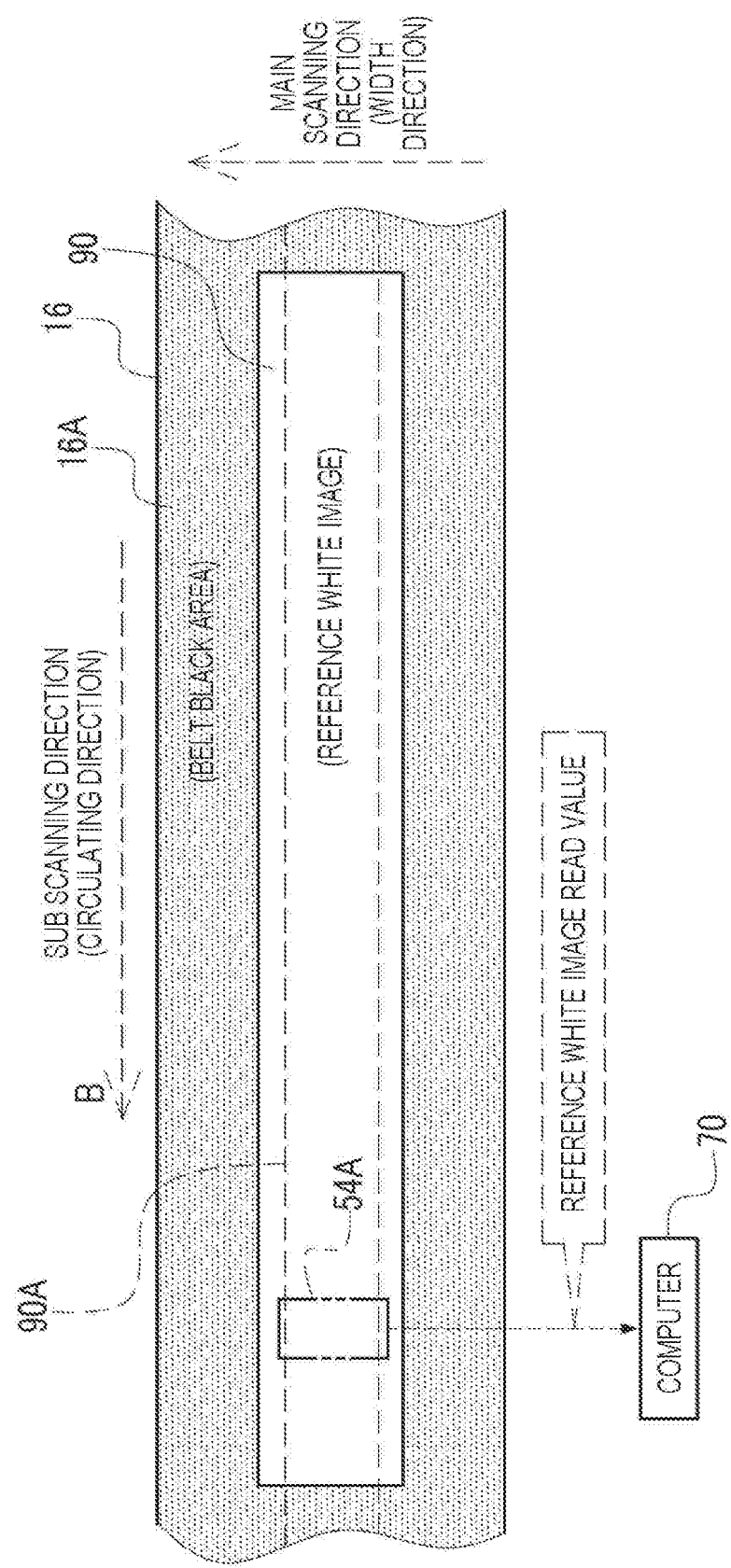
FIG. 3 is a conceptual diagram illustrating an example of an aspect in which a reference white image is formed on an intermediate transfer belt included in the image forming unit according to the exemplary embodiment.
Figure 4:
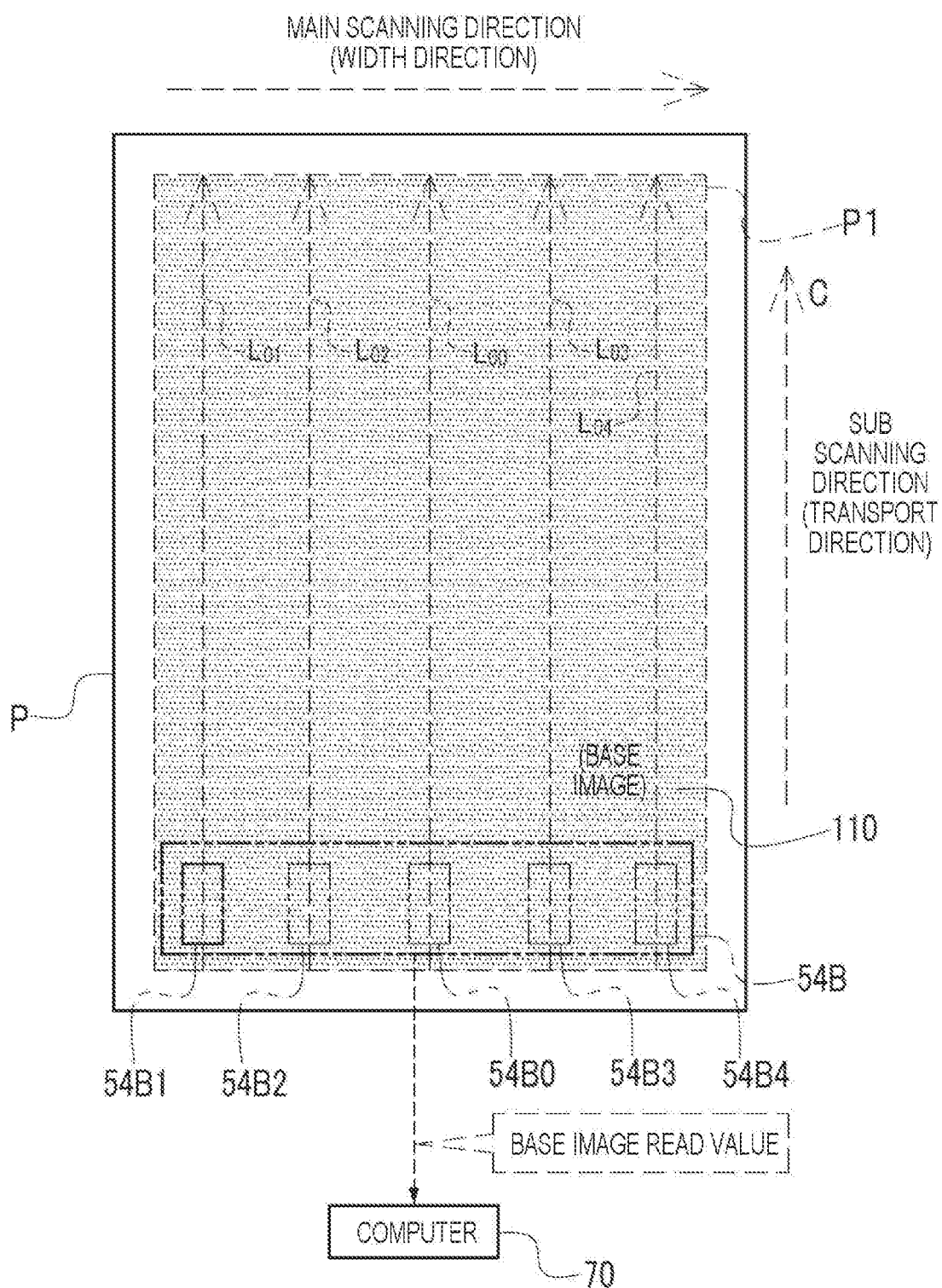
FIG. 4 is a conceptual diagram illustrating an example of an aspect in which a base image is formed on paper by the image forming unit according to the exemplary embodiment.
Figure 5:
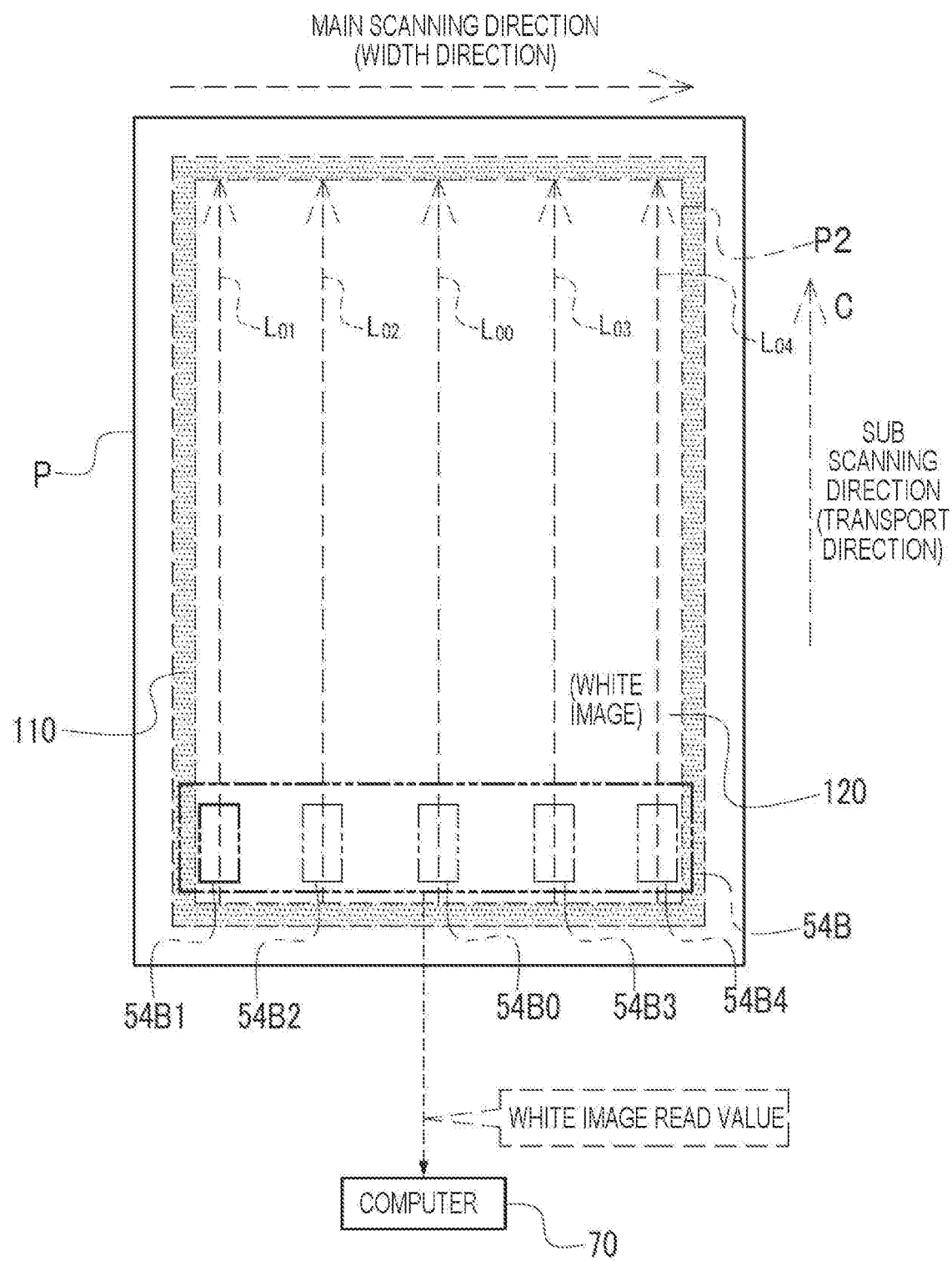
FIG. 5 is a conceptual diagram illustrating an example of an aspect in which a white image is additionally printed on the base image by the image forming unit according to the exemplary embodiment.

Therefore, in the image forming apparatus 50, as illustrated in FIGS. 3 to 5 as an example, the computer 70 acquires a reference white image read value, a base image read value, and a white image read value, and corrects in-plane density unevenness of the white image using the acquired reference white image read value, the acquired base image read value, and the acquired white image read value. A more detailed description will be given below.

As illustrated in FIG. 3 as an example, the intermediate transfer belt 16 has a belt black area 16A. The belt black area 16A is the surface of the intermediate transfer belt 16 and is formed in black. The color of a material of the intermediate transfer belt 16 is black, and the black color of the material of the intermediate transfer belt 16 is manifested as the black of the surface of the intermediate transfer belt 16, that is, the black of the belt black area 16A.

A belt-shaped reference white image 90 is formed along the sub scanning direction by the image forming unit 21W (see FIG. 2) in the central portion in the main scanning direction of the belt black area 16A, that is, in the width direction of the intermediate transfer belt 16. The reference white image 90 is a single-color image formed by transferring a white toner to the belt black area 16A. The single-color image means a so-called solid image. Meanwhile, the intermediate transfer belt 16 is an example of a "transfer member" according to the technology of the present disclosure, and the reference white image 90 is an example of a "reference image" according to the technology of the present disclosure. Further, white is an example of a "second color" according to the technology of the present disclosure.

The reference white image 90 is read by the first optical sensor 54A in a state where the intermediate transfer belt 16 circulates in the sub scanning direction. A reading area 90A as a target to be read by the first optical sensor 54A is divided such that the central portion in the main scanning direction of the reference white image 90 is read along the sub scanning direction. The reference white image 90 is read along the sub scanning direction by the first optical sensor 54A, and a reference white image read value which is the read result is output to the computer 70. The reference white image read value is an example of a "third read value" according to the technology of the present disclosure.

By the way, in order to correct in-plane density unevenness, in an area which an image may be formed and which is in the paper P on which the image is formed, a biased partial area is not set as a correction target area, but an area which is wide and continuous needs to be set as a correct target area. The expression "an area in which an image may be formed" as used herein refers to, for example, the maximum range defined as the range in which an image may be formed according to a positional relationship between the image forming unit 10 and the paper P. The positional relationship between the image forming unit 10 and the paper P refers to, for example, a positional relationship between the photoconductor drum 11, the developing roller 23, the primary transfer roller 15, the secondary transfer unit 17, the intermediate transfer belt 16, and the paper P. Further, in order to detect and correct in-plane density unevenness, with respect to the wide and continuous area, it is necessary to form an image on the paper P using image information of consistent tone values.

Thus, in the present exemplary embodiment, as illustrated in FIG. 4 as an example, the image forming unit 21K (see FIG. 2) forms a black base image 110 with respect to an area P1 in which in-plane density unevenness is confirmable within the paper P, whereby black is given to the area P1. The base image 110 is a black monochrome image. Here, the area P1 is an example of a "first area" according to the technology of the present disclosure. Black is an example of a "first color" according to the technology of the present disclosure.

In the example illustrated in FIG. 4, a margin is present between the area P1 and the paper P, but this is merely an example. For example, the area P1 may be the entire area of the surface of the paper P. The area P1 may be the entire area of the paper P if the maximum area defined as an area in which an image may be formed according to a positional relationship between the image forming unit 10 and the paper P is the entire area of the paper P. The area P1 only needs to be an area in which in-plane density unevenness is confirmable within the paper P (for example, a continuous area of 90% or more of the paper P). Further, in the example illustrated in FIG. 4, the area P1 is a rectangular area, but the technology of the present disclosure is not limited thereto, and the area P1 may be an area having another shape such as a circle, an ellipse, or a pentagon.

The second optical sensor 54B includes reading elements 54B0, 54B1, 54B2, 54B3 and 54B4. The reading elements 54B0, 54B1, 54B2, 54B3 and 54B4 are arranged at a predetermined interval (for example, equidistantly arranged) in a straight line along the width direction of the paper P, that is, the main scanning direction. Further, the reading elements 54B0, 54B1, 54B2, 54B3 and 54B4 are arranged in the order of the reading elements 54B1, 54B2, 54B0, 54B3 and 54B4 from one end side to the other end side of the paper P in the width direction.

The base image 110 is read along the sub scanning direction by the respective reading elements 54B0, 54B1, 54B2, 54B3 and 54B4. In the example illustrated in FIG. 4, the reading element 54B0 reads the base image 110 along a reading line $L_{00}$ in the sub scanning direction.

Further, the reading element 54B1 reads the base image 110 along a reading line $L_{01}$ in the sub scanning direction. Further, the reading element 54B2 reads the base image 110 along a reading line $L_{02}$ in the sub scanning direction. Further, the reading element 54B3 reads the base image 110 along a reading line $L_{03}$ in the sub scanning direction. Furthermore, the reading element 54B4 reads the base image 110 along a reading line $L_{04}$ in the sub scanning direction. A base image read value which is the result of reading the base image 110 by each of the reading elements 54B0, 54B1, 54B2, 54B3 and 54B4 is output to the computer 70. Meanwhile, the base image read value is an example of a "first read value" according to the technology of the present disclosure.

As illustrated in FIG. 5 as an example, a white image 120 that is a white image is additionally printed on the base image 110 in an area P2 by the image forming unit 21W (see FIG. 2), white is given to the area P2. That is, the white image 120 is superimposed on the base image 110, whereby white is applied to the black of the base in a superimposed manner. The area P2 is substantially the same as the area P1. In the example illustrated in FIG. 5, the area P2 is defined slightly inside the area P1. The expression "substantially the same" as used herein means not only completely identical but also identical in a sense including an allowable error in design and manufacture. Meanwhile, the area P2 is an example of a "second area" according to the technology of the present disclosure.

The white image 120 is used to correct in-plane density unevenness of white. Reading of an image necessary for correction of in-plane density unevenness of white may only need that white and black of the base overlap. In an area in which correction of density unevenness is not performed, white and black of the base may not overlap. That is, the area in which the base image 110 is formed and the area in which the white image 120 is formed may not completely match, but may be substantially the same.

The white image 120 is read along the sub scanning direction by the respective reading elements 54B0, 54B1, 54B2, 54B3 and 54B4. In the example illustrated in FIG. 5, the reading element 54B0 reads the white image 120 along the reading line $L_{00}$ in the sub scanning direction. Further, the reading element 54B1 reads the white image 120 along the reading line $L_{01}$ in the sub scanning direction. Further, the reading element 54B2 reads the white image 120 along the reading line $L_{02}$ in the sub scanning direction. Further, the reading element 54B3 reads the white image 120 along the reading line $L_{03}$ in the sub scanning direction.

Furthermore, the reading element 54B4 reads the white image 120 along the reading line $L_{04}$ in the sub scanning direction. A white image read value which is the result of reading the white image 120 by each of the reading elements 54B0, 54B1, 54B2, 54B3 and 54B4 is output to the computer 70. Meanwhile, the white image read value is an example of a "second read value" according to the technology of the present disclosure.

Figure 6:
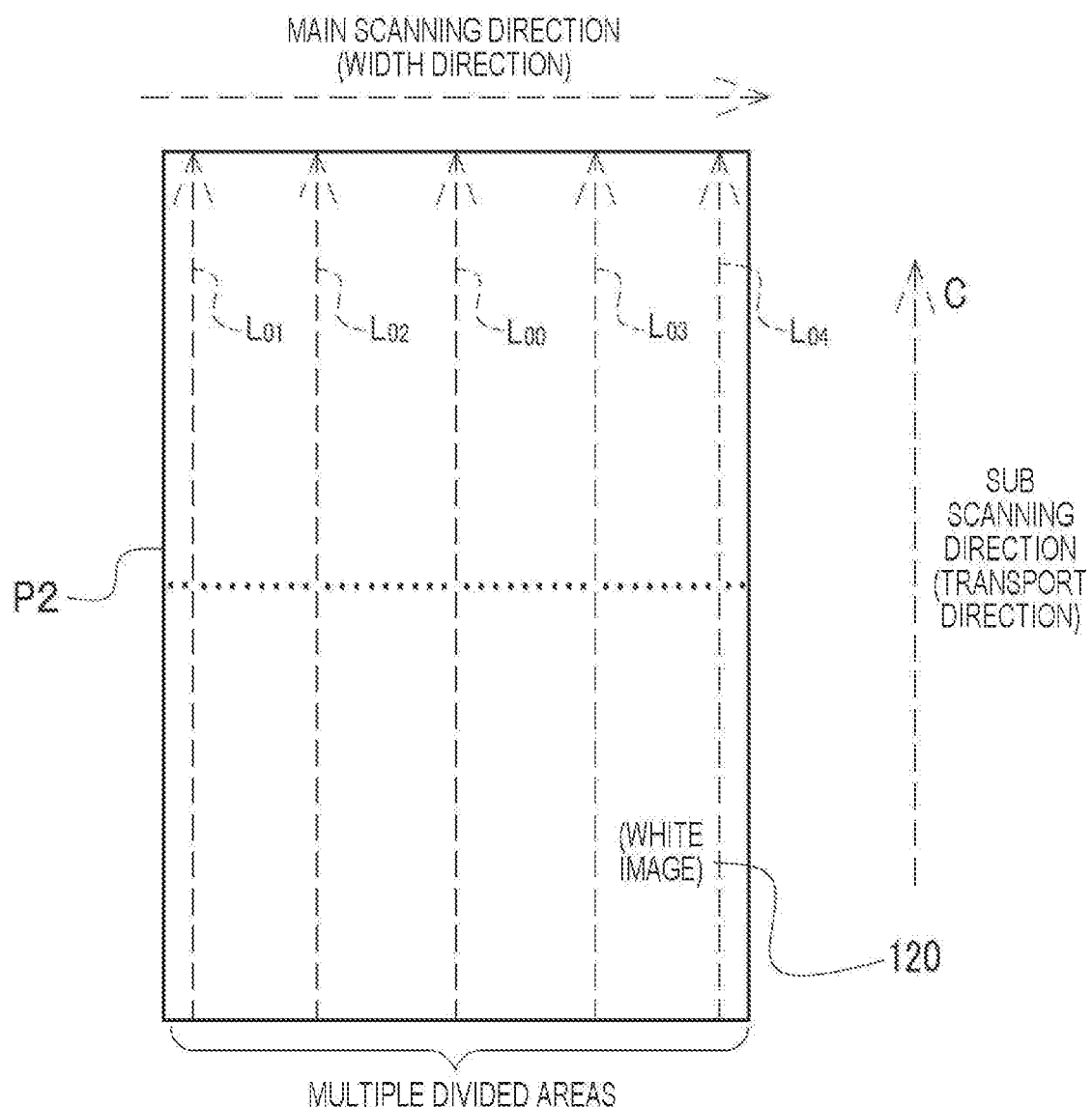
FIG. 6 is a conceptual diagram illustrating an example of an aspect of multiple divided areas in the white image formed on the base image in a superimposed manner by the image forming unit according to the exemplary embodiment.

As illustrated in FIG. 6 as an example, the area P2 has multiple divided areas including the reading lines $L_{00}$, $L_{01}$, $L_{02}$, $L_{03}$, and $L_{04}$. The multiple divided areas are obtained by dividing the area P2 along the main scanning direction. The reading lines $L_{00}$, $L_{01}$, $L_{02}$, $L_{03}$, and $L_{04}$ are partial divided areas included in the multiple divided areas, and are divided areas that represent the multiple divided areas. Among the reading lines $L_{00}$, $L_{01}$, $L_{02}$, $L_{03}$, and $L_{04}$, the reading line $L_{00}$ is a divided area serving as a reference of all of the divided areas.

Figure 7:
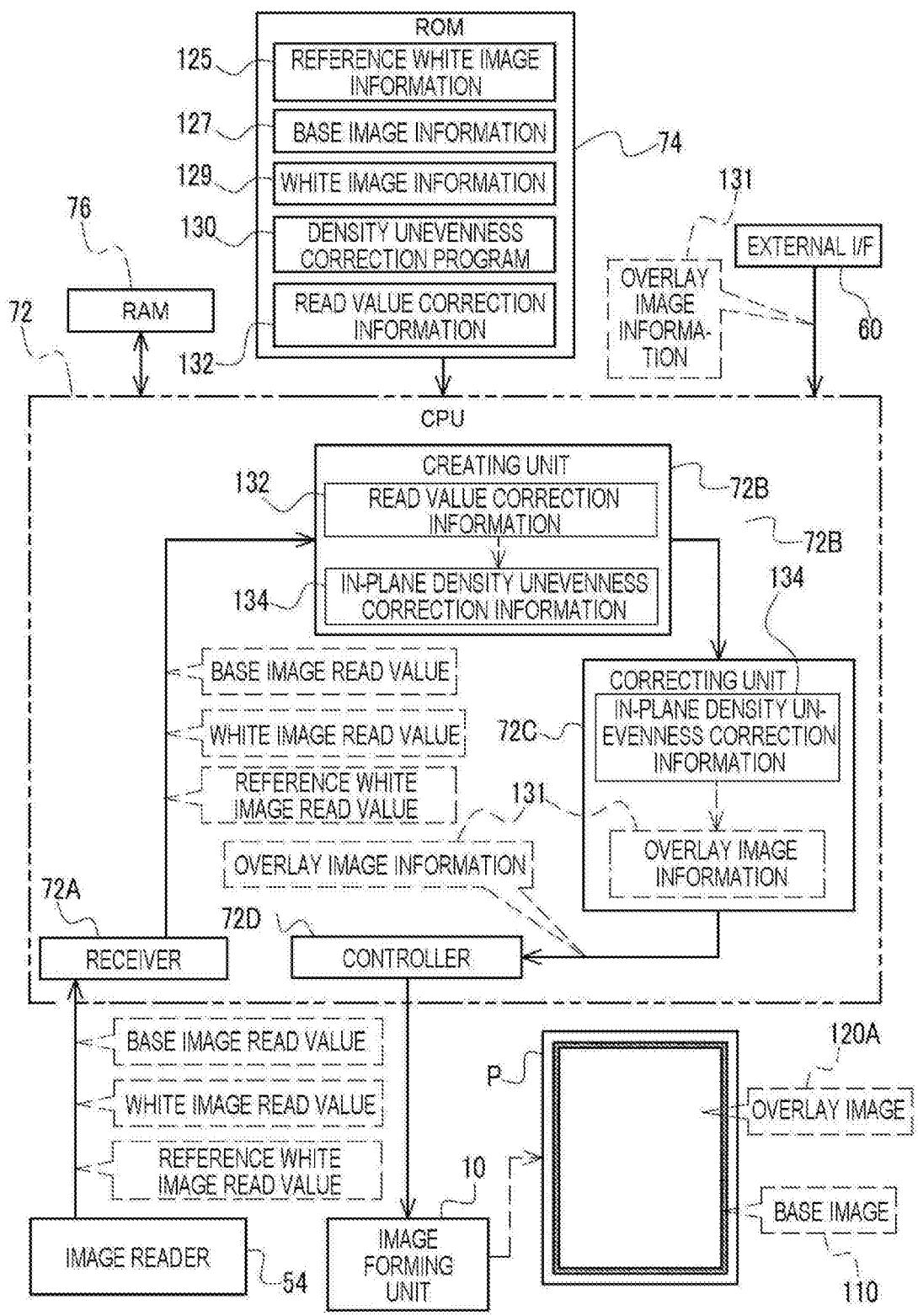
FIG. 7 is a block diagram illustrating an example of functions of the image forming apparatus according to the exemplary embodiment.

As illustrated in FIG. 7 as an example, the ROM 74 stores reference white image information 125 indicating the reference white image 90, base image information 127 indicating the base image 110, white image information 129 indicating the white image 120, a density unevenness correction program 130, and read value correction information 132. The density unevenness correction program 130 is an example of a "program" according to the technology of the present disclosure. The read value correction information 132 is an example of a "correspondence relationship" according to the technology of the present disclosure.

The CPU 72 reads out the density unevenness correction program 130 from the ROM 74 and develops the read-out density unevenness correction program 130 into the RAM 76. The CPU 72 operates as a receiver 72A, a creating unit 72B, a correcting unit 72C, and a controller 72D by executing the density unevenness correction program 130 developed in the RAM 76. The receiver 72A is an example of a "receiver" according to the technology of the present disclosure. The creating unit 72B and the correcting unit 72C are an example of a "correcting unit" according to the technology of the present disclosure.

The receiver 72A receives the base image read value, the white image read value, and the reference white image read value from the image reader 54. The creating unit 72B and the correcting unit 72C correct in-plane density unevenness of white, which is applied to the black in the superimposed manner, based on the base image read value and the white image read value received by the receiver 72A.

The creating unit 72B creates in-plane density unevenness correction information 134 based on the base image read value, the white image read value, and the reference white image read value received by the receiver 72A and the read value correction information 132 acquired from the ROM 74. The in-plane density unevenness correction information 134 is used to correct in-plane density unevenness of a white image formed on the base image 110 in the superimposed manner.

The correcting unit 72C acquires, from an external device (not illustrated), overlay image information 131 indicating an overlay image 120A which is a white image formed on the base image 110 in a superimposed manner via the external I/F 60, and corrects the acquired overlay image information 131 using the in-plane density unevenness correction information 134.

The controller 72D reads out the reference white image information 125 from the ROM 74, and controls the image forming unit 10 so that the reference white image 90 indicated by the read reference white image information 125 is formed in the belt black area 16A (see FIG. 3) of the intermediate transfer belt 16. Further, the controller 72D reads out the base image information 127 from the ROM 74, and controls the image forming unit 10 so that the base image 110 indicated by the read base image information 127 is formed in the area P1 of the paper P. Further, the controller 72D reads out the white image information 129 from the ROM 74, and controls the image forming unit 10 so that the white image 120 indicated by the read white image information 129 is formed in the area P2 on the base image 110. Furthermore, the controller 72D controls the image forming unit 10 so that the overlay image 120A indicated by the overlay image information 131 corrected by the correcting unit 72C is formed on the base image 110 in the superimposed manner.

Figure 8:
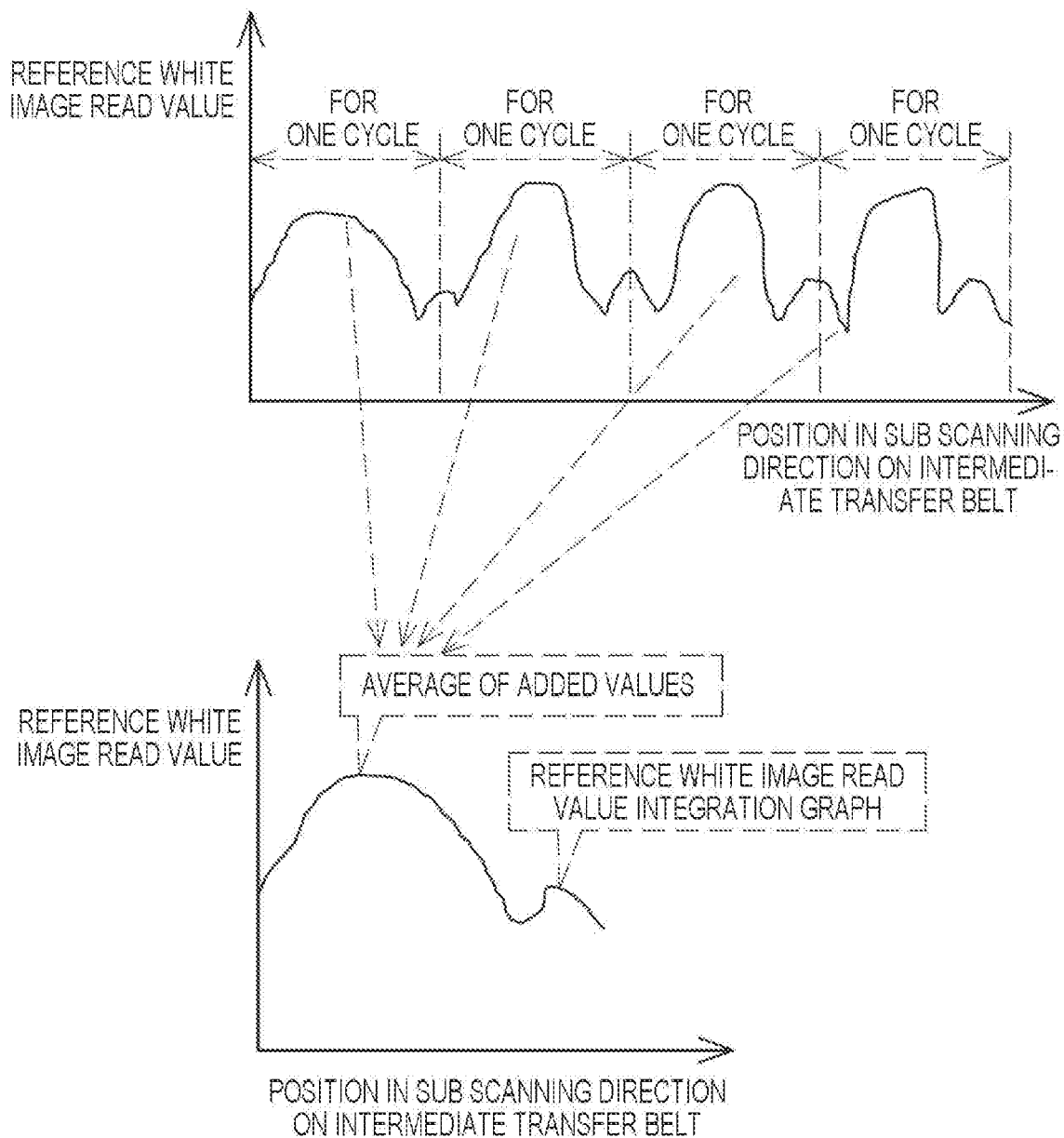
FIG. 8 is an explanatory diagram of assistance in explaining a method of creating a reference white image read value integration graph by a creating unit according to the exemplary embodiment.

FIG. 8 illustrates a reference white image read value graph illustrating an example of the correlation between the reference white image read value and the position in the sub scanning direction on the intermediate transfer belt 16. In the reference white image read value graph illustrated in FIG. 8, the vertical axis is the reference white image read value and the horizontal axis is the position in the sub scanning direction on the intermediate transfer belt 16. As illustrated in FIG. 8 as an example, the reference white image read value is obtained by the first optical sensor 54A for each image area for one cycle. The term "one cycle" as used herein refers to a cycle corresponding to one rotation of the photoconductor drum 11. Further, the expression "image area for one cycle" as used herein refers to the area of an image transferred to the belt black area 16A by one rotation of the photoconductor drum 11 among the belt black area 16A. In the example illustrated in FIG. 8, reference white image read values for four cycles obtained by the first optical sensor 54A are illustrated. Meanwhile, although the reference white image read values for four cycles are illustrated in the example illustrated in FIG. 8, this is merely an example. Reference white image read values for plural cycles only needs to be obtained.

The creating unit 72B creates a reference white image read value integration graph by integrating the reference white image read values for four cycles into that for one cycle. The reference white image read value integration graph is a graph obtained by adding the reference white image read values for four cycles and averaging the values for one cycle. That is, the reference white image read value integration graph is a graph illustrating the correlation between a value obtained by adding the reference white reference read values for four cycles and averaging the values for one cycle and the position in the sub scanning direction on the intermediate transfer belt 16.

Figure 9:
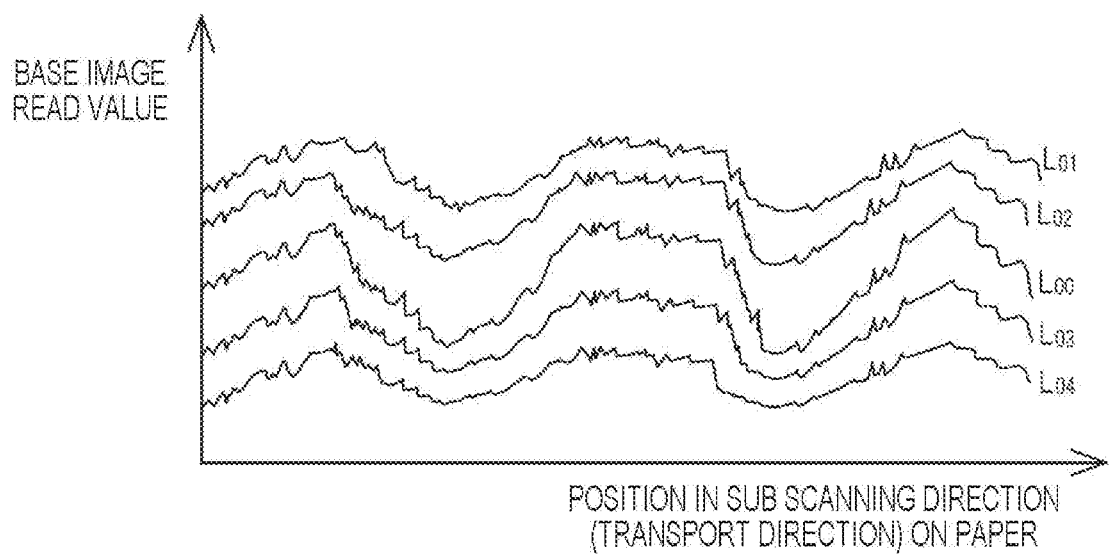
FIG. 9 is a graph illustrating an example of the correlation between a base image read value obtained by reading the base image by a second optical sensor according to the exemplary embodiment and the position of the paper in a sub scanning direction.

FIG. 9 illustrates a base image read value graph illustrating an example of the correlation between the base image read value and the position in the sub scanning direction on the paper P. In the base image read value graph illustrated in FIG. 9, the vertical axis is the base image read value and the horizontal axis is the position in the sub scanning direction on the paper P. The creating unit 72B creates the base image read value graph for each of the reading lines $L_{00}$, $L_{01}$, $L_{02}$, $L_{03}$, and $L_{04}$ using base image read values obtained by reading each of the reading lines $L_{00}$, $L_{01}$, $L_{02}$, $L_{03}$, and $L_{04}$.

Figure 10:
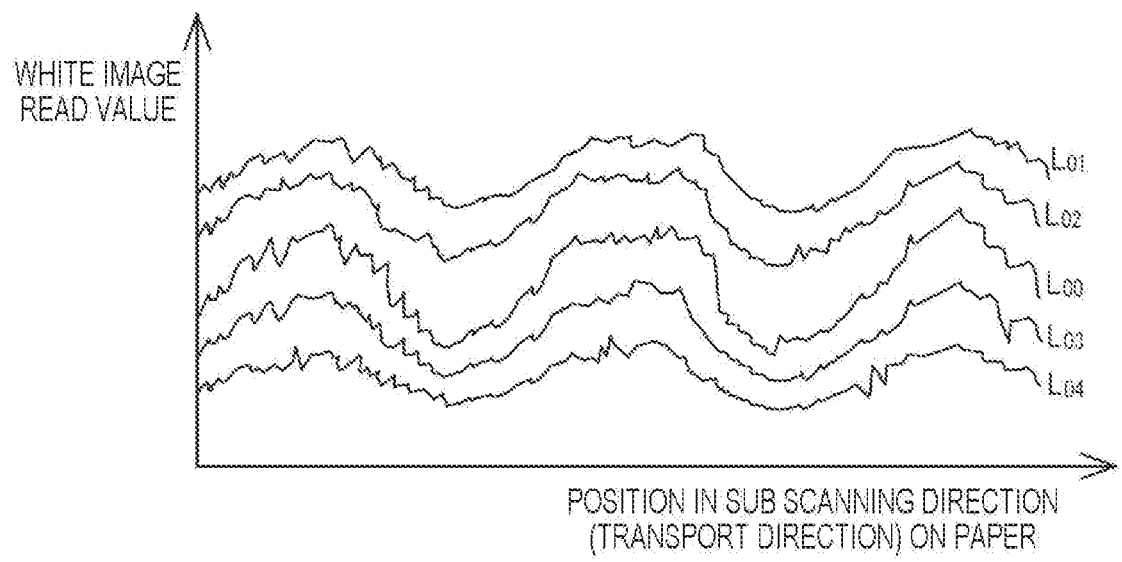
FIG. 10 is a graph illustrating an example of the correlation between a white image read value obtained by reading the white image on the base image by the second optical sensor according to the exemplary embodiment and the position of the paper in the sub scanning direction.

FIG. 10 illustrates a white image read value graph illustrating an example of the correlation between the white image read value and the position in the sub scanning direction on the paper P. In the white image read value graph illustrated in FIG. 10, the vertical axis is the white image read value and the horizontal axis is the position in the sub scanning direction on the paper P. The creating unit 72B creates the white image read value graph for each of the reading lines $L_{00}$, $L_{01}$, $L_{02}$, $L_{03}$, and $L_{04}$, using white image read values obtained by reading each of the reading lines $L_{00}$, $L_{01}$, $L_{02}$, $L_{03}$, and $L_{04}$.

As illustrated in FIG. 11 as an example, the read value correction information 132 is a table in which the base image read value, the white image read value, and a corrected read value are associated. The corrected read value is a read value obtained by removing the influence of the color of the base image 110 from the white image read value. The corrected read value is a value derived in advance, from the results of a test on a real machine and a computer simulation, for example, as a read value from which the influence of the color of the base image 110 has been removed from the white image read value.

The creating unit 72B derives a corrected read value based on the base image read value and the white image read value received for each of the reading lines $L_{00}$, $L_{01}$, $L_{02}$, $L_{03}$, and $L_{04}$ by the receiver 72A. Then, the correcting unit 72C corrects the overlay image information 131 based on the derived corrected read value. By correcting the overlay image information 131, in-plane density unevenness of the overlay image 120A formed on the base image 110 in the superimposed manner is corrected.

Figure 12:
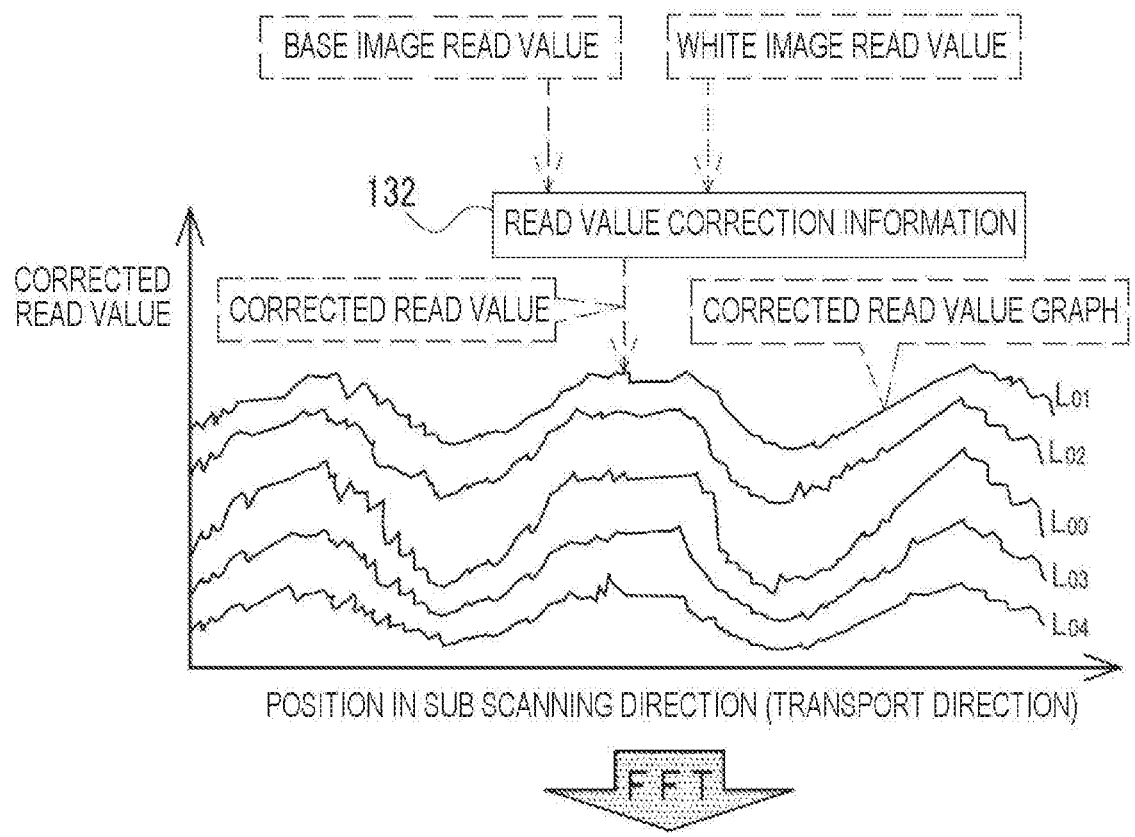
FIG. 12 is an explanatory diagram of assistance in explaining a method of creating a corrected read value graph by the creating unit, a method of calculating an amplitude ratio, and a method of calculating a phase difference according to the exemplary embodiment.

Derivation of the corrected read value is performed using the read value correction information 132. That is, the corrected read value corresponding to the receiving result in the receiver 72A is derived from the read value correction information 132. Specifically, as illustrated in FIG. 12 as an example, the corrected read value corresponding to the base image read value and the white image read value received for each of the reading lines $L_{00}$, $L_{01}$, $L_{02}$, $L_{03}$, and $L_{04}$ by the receiver 72A is derived from the read value correction information 132. Then, a corrected read value graph indicating the correlation between the derived corrected read value and the position in the sub scanning direction is created for each of the reading lines $L_{00}$, $L_{01}$, $L_{02}$, $L_{03}$, and $L_{04}$.

The correcting unit 72C corrects the overlay image information 131 using a correction value (to be described in detail later) based on the corrected read value graph created for each of the reading lines $L_{00}$, $L_{01}$, $L_{02}$, $L_{03}$, and $L_4$. Specifically, the correction value based on the corrected read value graph is developed into the plane defined by the position in the main scanning direction and the position in the sub scanning direction of each of the reading lines $L_{00}$, $L_{01}$, $L_{02}$, $L_{03}$, and $L_{04}$, and the overlay image information 131 is corrected using the developed correction value. The creating unit 72B develops the correction value based on the corrected read value graph created for each of the reading lines $L_{00}$, $L_{01}$, $L_{02}$, $L_{03}$, and $L_{04}$ in the main scanning direction by an interpolation method.

When developing the correction value based on the corrected read value graph, the correction value based on the corrected read value graph created for the reading line $L_{00}$ is developed according to a corrected read value deviation characteristic into the plane defined by the position in the main scanning direction and the position in the sub scanning direction of each of the reading lines $L_{00}$, $L_{01}$, $L_{02}$, $L_{03}$, and $L_{04}$. The corrected read value deviation characteristic is a characteristic of deviation between corrected read values for the respective reading lines $L_{00}$, $L_{01}$, $L_{02}$, $L_{03}$, and $L_{04}$, in other words, a characteristic of deviation between corrected read value graphs created for the respective reading lines $L_{00}$, $L_{01}$, $L_{02}$, $L_{03}$, and $L_{04}$. Here, the reading line $L_{00}$ is an example of a "reference divided area" according to the technology of the present disclosure.

As illustrated in FIG. 12 as an example, the corrected read value deviation characteristic is defined using the amplitude ratio of the corrected read values between the reading lines $L_{00}$, $L_{01}$, $L_{02}$, $L_{03}$, and $L_{04}$, and the phase difference of the corrected read values between the reading lines $L_{00}$, $L_{01}$, $L_{02}$, $L_{03}$, and $L_{04}$. The phase difference is a factor that indicates the degree of deviation in the sub scanning direction between members related to the transfer of an image. For example, the amount of deviation between the photoconductor drum 11 and the developing roller 23 and the amount of deviation between the photoconductor drum 11 and the intermediate transfer belt 16 are expressed as the phase difference. Meanwhile, hereinafter, for convenience of explanation, the amplitude ratio of the corrected read values between the reading lines $L_{00}$, $L_{01}$, $L_{02}$, $L_{03}$, and $L_{04}$ is also simply referred to as "amplitude ratio". Further, hereinafter, for convenience of explanation, the phase difference of the corrected read values between the reading lines $L_{00}$, $L_{01}$, $L_{02}$, $L_{03}$, and $L_{04}$, is also simply referred to as "phase difference".

The amplitude ratio is obtained by performing discrete Fourier transform on the corrected read value for each of the reading lines $L_{00}$, $L_{01}$, $L_{02}$, $L_{03}$, and $L_{04}$, that is, the corrected read value graph created for each of the reading lines $L_{00}$, $L_{01}$, $L_{02}$, $L_{03}$, and $L_{04}$. In the present exemplary embodiment, FFT is employed as an algorithm that executes discrete Fourier transform.

When the corrected read value graph for the reading line $L_{00}$ is a reference corrected read value graph, the amplitude ratio for each of the reading lines $L_{00}$, $L_{01}$, $L_{02}$, $L_{03}$, and $L_{04}$ is the ratio of the amplitude of the corrected read value graph for each reading line to the amplitude of the reference corrected read value graph. The phase difference for each of the reading lines $L_{00}$, $L_{01}$, $L_{02}$, $L_{03}$, and $L_{04}$ is the difference between the phase of the reference corrected read value graph and the phase of the corrected read value graph for each reading line. The term "difference" as used herein is, for example, a value obtained by subtracting the phase of the corrected read value graph for each reading line from the phase of the reference corrected read value graph. In this case, a negative difference value means that the phase is behind the reference corrected read value graph, and a positive difference value means that the phase is ahead of the reference corrected read value graph. Meanwhile, in the example illustrated in FIG. 12, the amplitude ratio for each reading line is normalized based on "1", and the phase difference for each reading line is normalized based on "0".

Figure 13:
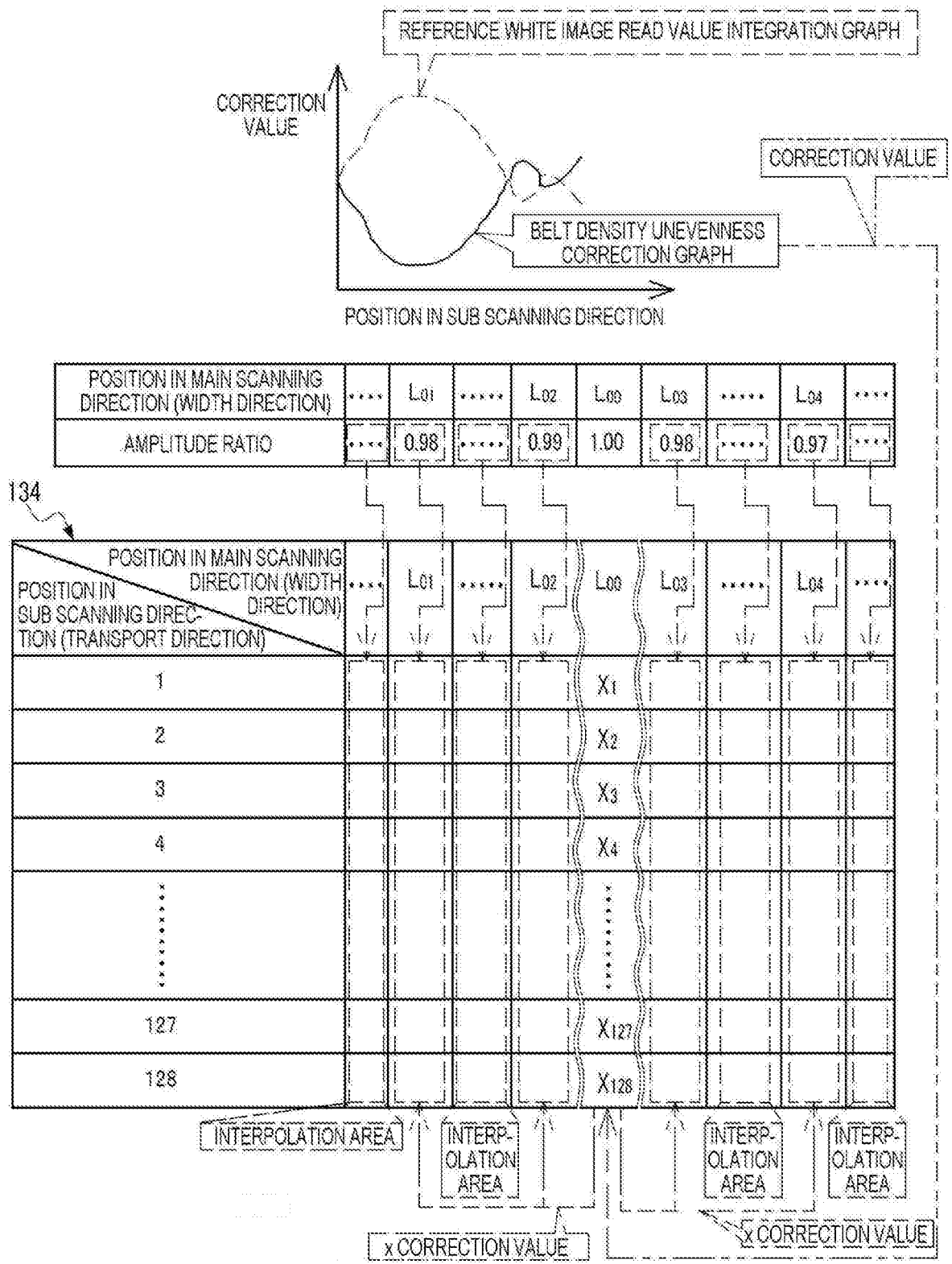
FIG. 13 is an explanatory diagram of assistance in explaining a method of creating a belt density unevenness correction graph and a method of creating in-plane density unevenness correction information by developing a correction value indicated by the belt density unevenness correction graph into a plane according to the amplitude ratio according to the exemplary embodiment.

As illustrated in FIG. 13 as an example, the creating unit 72B creates a belt density unevenness correction graph that indicates the inverse function of the reference white image read value integration graph. The belt density unevenness correction graph is a graph illustrating the correlation between a correction value (hereinafter, also simply referred to as "correction value") which corrects in-plane density unevenness of the white image 120 formed on the base image 110 in the superimposed manner and the position in the sub scanning direction (for example, the position of the paper P in the transport direction C). Meanwhile, the term "correction value" as used herein means the above-mentioned "correction value based on the corrected read value graph".

The in-plane density unevenness correction information 134 is a table in which the position in the main scanning direction (for example, the position of the paper P in the width direction), the position in the sub scanning direction (for example, the position of the paper P in the transport direction C), and a correction value are associated. In the example illustrated in FIG. 13, the position in the sub scanning direction is defined by dividing the area in the transport direction C of the paper P into 128 equal parts. The position in the main scanning direction is defined based on the reading lines $L_{00}$, $L_{01}$, $L_{02}$, $L_{03}$, and $L_{04}$. For the reading line $L_{00}$, the correction value indicated by the belt density unevenness correction graph is assigned to each position in the sub scanning direction.

In the example illustrated in FIG. 13, correction values from $X_1$ to $X_{128}$ are indicated. The correction values of the reading line $L_{00}$ (in the example illustrated in FIG. 13, from the correction value $X_1$ to the correction value $X_{128}$) are developed by the creating unit 72B with respect to the reading lines $L_{01}$, $L_{02}$, $L_{03}$, and $L_{04}$ according to the amplitude ratio of each of the reading lines $L_{01}$, $L_{02}$, $L_{03}$, and $L_{04}$. That is, the value obtained by multiplying the correction value of the reading line $L_{00}$ by the amplitude ratio of each of the reading lines $L_{01}$, $L_{02}$, $L_{03}$, and $L_{04}$ is regarded as the correction value of each of the reading lines $L_{01}$, $L_{02}$, $L_{03}$, and $L_{04}$.

The correction values of each of the reading lines $L_{01}$, $L_{02}$, $L_{03}$, and $L_{04}$ are developed in the main scanning direction by an interpolation method. Multiple divided areas other than the reading lines $L_{00}$, $L_{01}$, $L_{02}$, $L_{03}$, and $L_{04}$ are regarded as interpolation areas, and for the multiple divided areas other than the reading lines $L_{00}$, $L_{01}$, $L_{02}$, $L_{03}$, and $L_{04}$, the amplitude ratio of each of the reading lines $L_{01}$, $L_{02}$, $L_{03}$, and $L_{04}$ is developed by linear interpolation.

Each value obtained by multiplying each amplitude ratio of the multiple divided areas other than the reading lines $L_{00}$, $L_{01}$, $L_{02}$, $L_{03}$, and $L_{04}$ by the correction value of the reading line $L_{00}$ is regarded as the correction value of each of the multiple divided areas other than the reading lines $L_{00}$, $L_{01}$, $L_{02}$, $L_{03}$, and $L_{04}$.

Figure 14:
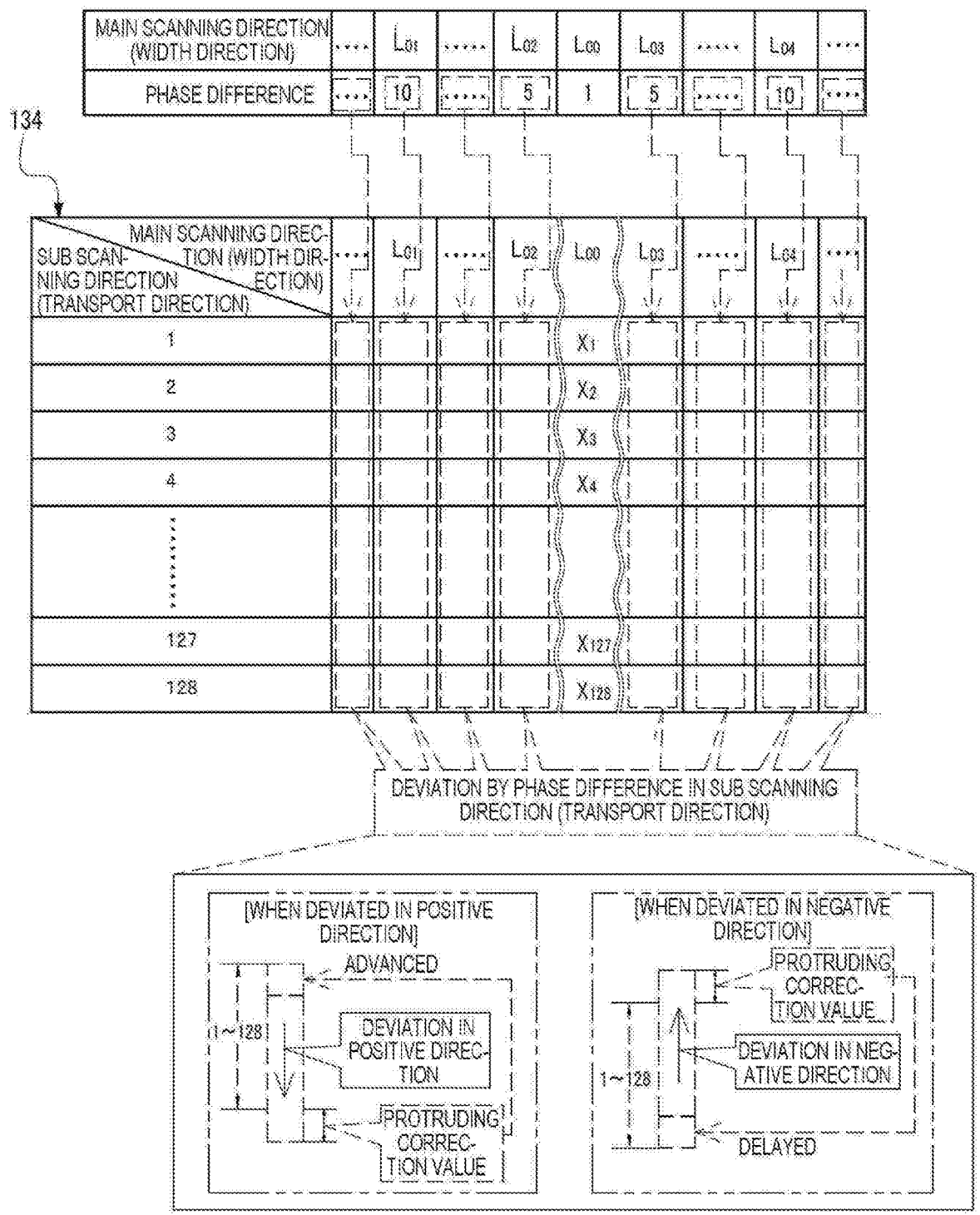
FIG. 14 is an explanatory diagram of assistance in explaining a method of creating in-plane density unevenness correction information by developing the correction value indicated by the belt density unevenness correction graph into a plane according to the phase difference according to the exemplary embodiment.

The correction values assigned to the multiple divided areas in this way, as illustrated in FIG. 14 as an example, are deviated in the sub scanning direction by the phase difference of each of the reading lines $L_{00}$, $L_{01}$, $L_{02}$, $L_{03}$, and $L_{04}$. That is, each correction value of the reading lines $L_{00}$, $L_{01}$, $L_{02}$, $L_{03}$, and $L_{04}$ is deviated in the sub scanning direction so that the phase difference of each of the reading lines $L_{00}$, $L_{01}$, $L_{02}$, $L_{03}$, and $L_{04}$ becomes "0".

The phase difference of each of the reading lines $L_{01}$, $L_{02}$, $L_{03}$, and $L_{04}$ is developed by linear interpolation for the multiple divided areas other than the reading lines $L_{00}$, $L_{01}$, $L_{02}$, $L_{03}$, and $L_{04}$. Each correction value assigned to the multiple divided areas other than the reading lines $L_{00}$, $L_{01}$, $L_{02}$, $L_{03}$, and $L_{04}$ is deviated in the sub scanning direction by the phase difference assigned to each of the multiple divided areas other than the reading lines $L_{00}$, $L_{01}$, $L_{02}$, $L_{03}$, and $L_{04}$. That is, each correction value of the multiple divided areas other than the reading lines $L_{00}$, $L_{01}$, $L_{02}$, $L_{03}$, and $L_{04}$ is deviated in the sub scanning direction so that the phase difference of the multiple divided areas other than the reading lines $L_{00}$, $L_{01}$, $L_{02}$, $L_{03}$, and $L_{04}$ becomes "0".

When the phase difference is a positive value, the correction value is deviated in the sub scanning direction so as to delay the phase, and when the phase difference is a negative value, the correction value is deviated in the sub scanning direction so as to advance the phase. When the correction value is deviated in the positive direction of the sub scanning direction in each divided area, the correction value which protrudes from the tail of a predetermined range in the sub scanning direction (the range from 1 to 128 in the example illustrated in FIG. 14) by deviation in the positive direction is ahead of the head in the sub scanning direction. Conversely, when the correction value is deviated in the negative direction of the sub scanning direction in each divided area, the correction value which protrudes from the head of the predetermined range in the sub scanning direction by deviation in the negative direction is behind the tail in the sub scanning direction.

As described above, the creating unit 72B creates the in-plane density unevenness correction information 134 by developing the correction values of the reading line $L_{00}$ into the multiple divided areas in the main scanning direction according to the amplitude ratio and the phase difference. Thus, the in-plane density unevenness correction information 134 is a table in which the correction values are developed in a two-dimensional manner in a designated plane in the multiple divided areas in the main scanning direction and at each position in the sub scanning direction.

Figure 15A:
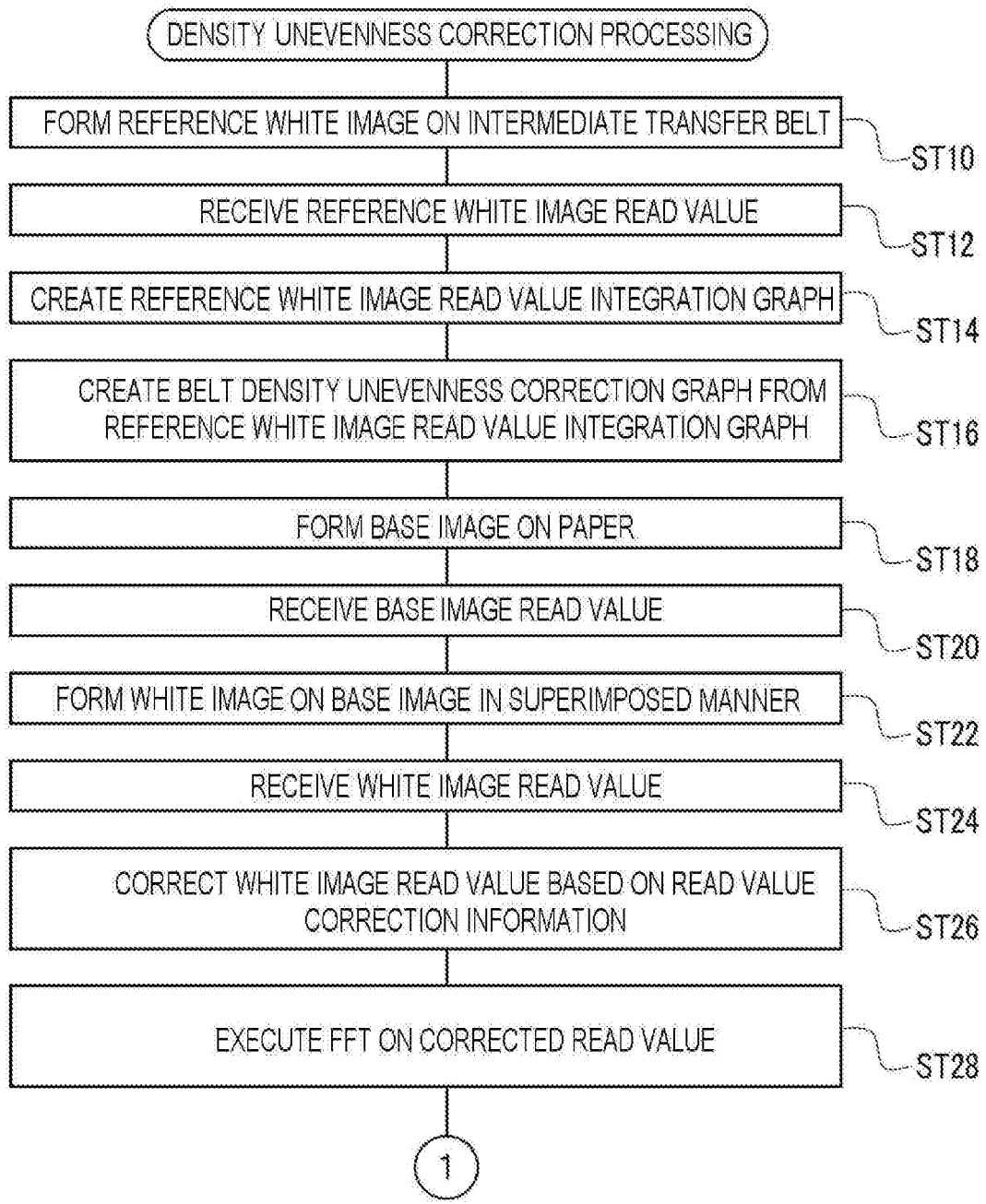
FIG. 15A is a flowchart illustrating an example of the flow of an image unevenness correction process according to the exemplary embodiment.
Figure 15B:
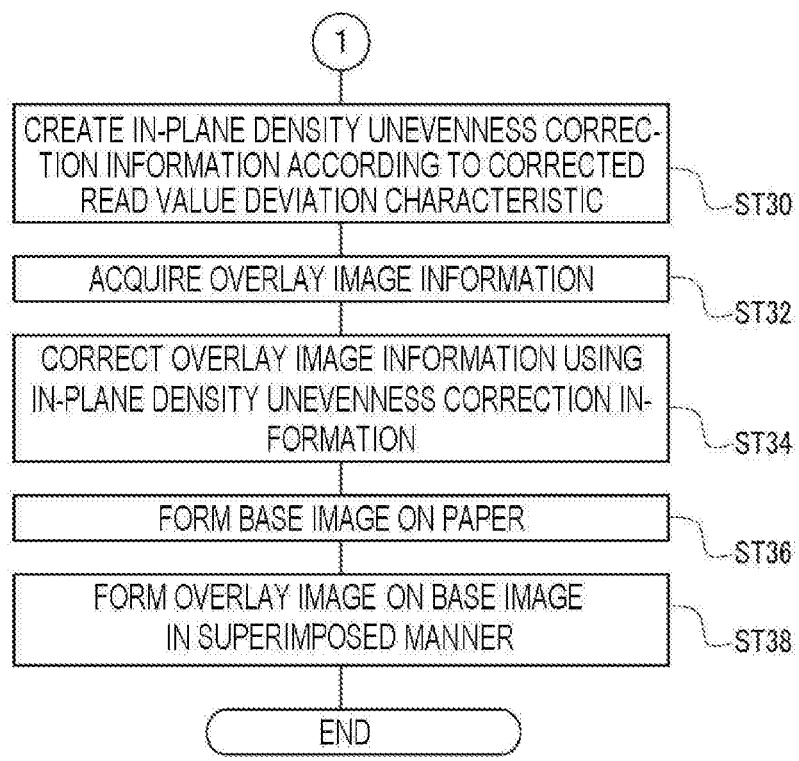
FIG. 15B is a continuation of the flowchart illustrated in FIG. 15A.

Next, an operation of the image forming apparatus 50 will be described with reference to FIGS. 15A and 15B. FIGS. 15A and 15B illustrate an example of the flow of a density unevenness correction process executed by the CPU 72 according to the density unevenness correction program 130.

In the density unevenness correction process illustrated in FIG. 15A, first, in step ST10, the controller 72D causes the image forming unit 10 to form the reference white image 90 (see FIG. 3) in the belt black area 16A of the intermediate transfer belt 16, and thereafter, the density unevenness correction process proceeds to step ST12.

When the process of step ST10 is executed, the reference white image 90 for plural cycles is read by the first optical sensor 54A, and a reference white image read value which is the read result of the reference white image 90 is obtained. The reference white image read value is output to the CPU 72 by the first optical sensor 54A.

In step ST12, the receiver 72A receives the reference white image read values for the plural cycles output from the first optical sensor 54A, and thereafter, the density unevenness correction process proceeds to step ST14.

In step ST14, the creating unit 72B creates a reference white image read value integration graph (see FIGS. 8 and 13) by integrating the reference white image read values for the plural cycles received by the receiver 72A, and thereafter, the density unevenness correction process proceeds to step ST16.

In step ST16, the creating unit 72B creates a belt density unevenness correction graph (see FIG. 13) from the reference white read value integration graph, and the density unevenness correction process proceeds to step ST18.

In step ST18, the controller 72D causes the image forming unit 10 to form the base image 110 in the area P1 of the paper P, and thereafter, the density unevenness correction process proceeds to step ST20.

When the process of step ST18 is executed, the base image 110 is read along the reading lines $L_{00}$, $L_{01}$, $L_{02}$, $L_{03}$, and $L_{04}$ by the second optical sensor 54B, and a base image read value which is the read result of the base image 110 is obtained. The base image read value is output to the CPU 72 by the second optical sensor 54B.

In step ST20, the receiver 72A receives the base image read value output from the second optical sensor 54B, and thereafter, the density unevenness correction process proceeds to step ST22.

In step ST22, the controller 72D causes the image forming unit 10 to form the white image 120 in the area P2 on the base image 110 in the superimposed manner, and thereafter, the density unevenness correction process proceeds to step ST24. Meanwhile, here, forming the white image 120 on the base image 110 in the superimposed manner means, in other words, additionally printing the white image 120 on the base image 110.

When the process of step ST22 is executed, the white image 120 is read along the reading lines $L_{00}$, $L_{01}$, $L_{02}$, $L_{03}$, and $L_{04}$ by the second optical sensor 54B, and a white image read value which is the read result of the white image 120 is obtained. The white image read value is output to the CPU 72 by the second optical sensor 54B.

In step ST24, the receiver 72A receives the white image read value output from the second optical sensor 54B for each of the reading lines $L_{00}$, $L_{01}$, $L_{02}$, $L_{03}$, and $L_{04}$, and thereafter, the density unevenness correction process proceeds to step ST26.

In step ST26, the creating unit 72B reads out the read value correction information 132 from the ROM 74. Then, the creating unit 72B corrects the white image read value received by the receiver 72A for each of the reading lines $L_{00}$, $L_{01}$, $L_{02}$, $L_{03}$, and $L_{04}$ into a corrected read value based on the read-out read value correction information, and thereafter, the density unevenness correction process proceeds to step ST28.

By executing the process of step ST26, the creating unit 72B creates a corrected read value graph (see FIG. 12) for each of the reading lines $L_{00}$, $L_{01}$, $L_{02}$, $L_{03}$, and $L_{04}$.

In step ST28, the creating unit 72B executes FFT on the corrected read value graph for each of the reading lines $L_{00}$, $L_{01}$, $L_{02}$, $L_{03}$, and $L_{04}$, and thereafter, the density unevenness correction process proceeds to step ST30 illustrated in FIG. 15B.

By executing the process of step ST28, the amplitude and the phase for each of the reading lines $L_{00}$, $L_{01}$, $L_{02}$, $L_{03}$, and $L_{04}$ are calculated. Then, the amplitude ratio and the phase difference are calculated as a corrected read value deviation characteristic for each of the reading lines $L_{00}$, $L_{01}$, $L_{02}$, $L_{03}$, and $L_{04}$ from the amplitude and the phase calculated for each of the reading lines $L_{00}$, $L_{01}$, $L_{02}$, $L_{03}$, and $L_{04}$ (see FIG. 12).

In step ST30 illustrated in FIG. 15B, the creating unit 72B creates the in-plane density unevenness correction information 134 (see FIG. 14) according to the corrected read value deviation characteristic. That is, the creating unit 72B creates the in-plane density unevenness correction information 134 by developing the correction value for each of the reading lines $L_{00}$, $L_{01}$, $L_{02}$, $L_{03}$, and $L_{04}$ into the plane defined by the position in the main scanning direction and the position in the sub scanning direction of each of multiple divided areas according to the corrected read value deviation characteristic, and thereafter, the density unevenness correction process proceeds to step ST32.

In step ST32, the correcting unit 72C acquires the overlay image information 131, and thereafter, the density unevenness correction process proceeds to step ST34.

In step ST34, the correcting unit 72C corrects the overlay image information 131 using the in-plane density unevenness correction information 134, and thereafter, the density unevenness correction process proceeds to step ST36. By executing the process of step ST34, among the correction values included in the in-plane density unevenness correction information 134, the correction value of the position corresponding to the position of each pixel included in the overlay image information 131 is acquired from the in-plane density unevenness correction information 134 by the correcting unit 72C. Then, the pixel value of each pixel included in the overlay image information 131 is corrected by the acquired correction value. Thus, in-plane density unevenness of the overlay image 120A indicated by the overlay image information 131 is corrected.

In addition, the correction values included in the in-plane density unevenness correction information 134 are an example of a "correction value based on a corrected read value", a "correction value based on a third read value", and a "developed correction value" according to the technology of the present disclosure.

In step ST36, the controller 72D causes the image forming unit 10 to form the base image 110 in the area P1 of the paper P. and thereafter, the density unevenness correction process proceeds to step ST38.

In step ST38, the controller 72D causes the image forming unit 10 to form the overlay image 120A indicated by the overlay image information 131, the pixel value of which has been corrected by the correction value of the in-plane density unevenness correction information 134, on the base image 110 in the superimposed manner, and thereafter, the density unevenness correction process is completed. Meanwhile, here, forming the overlay image 120A on the base image 110 in the superimposed manner means, in other words, additionally printing the overlay image 120A on the base image 110.

As described above, by executing the density unevenness correction process, the density unevenness of the overlay image 120A is corrected based on the base image read value and the white image read value received by the receiver 72A. That is, the density unevenness of the overlay image 120A is corrected in a state where the influence from the base image 110 and the influence from the intermediate transfer belt 16 have been removed. Thus, as compared with a case of correcting the density unevenness of the overlay image 120A when the overlay image 120A is formed on the base image 110 in the superimposed manner without considering the in-plane density unevenness of the base image 110, the in-plane density unevenness of the overlay image 120A is corrected with high accuracy.

Meanwhile, a mode in which the overlay image 120A is corrected using the in-plane density unevenness correction information 134 has been described in the above exemplary embodiment by way of example, but the technology of the present disclosure is not limited thereto. For example, as illustrated in FIG. 16, the pixel value of each pixel included in the overlay image information 131 may be corrected by the correcting unit 72C using a correction value graph indicating the correlation between the correction value defined by the inverse function of the corrected read value graph for each of the reading lines $L_{00}$, $L_{01}$, $L_{02}$, $L_{03}$, and $L_{04}$ and the position in the sub scanning direction. In this case, the correction value defined by the inverse function of the corrected read value graph is an example of a "correction value based on the corrected read value" according to the technology of the present disclosure.

The correcting unit 72C may develop the correction value indicated by the correction value graph obtained for each of the reading lines $L_{00}$, $L_{01}$, $L_{02}$, $L_{03}$, and $L_{04}$ into the plane defined by the position in the main scanning direction and the position in the sub scanning direction of each of the reading lines $L_{00}$, $L_{01}$, $L_{02}$, $L_{03}$, and $L_{04}$, and may correct the pixel value of each pixel included in the overlay image information 131 using the developed correction value.

In this case, the correcting unit 72C develops the correction values for each of the reading lines $L_{00}$, $L_{01}$, $L_{02}$, $L_{03}$, and $L_{04}$ in the main scanning direction by an interpolation method. Specifically, the correction value graph for each of the reading lines $L_{00}$, $L_{01}$, $L_{02}$, $L_{03}$, and $L_{04}$ is developed in the main scanning direction. Development of the correction value graph in the main scanning direction means development of the correction values into multiple divided areas other than the reading lines $L_{00}$, $L_{01}$, $L_{02}$, $L_{03}$, and $L_{04}$.

Further, the correcting unit 72C may develop the correction value indicated by the correction value graph for the reading line $L_{00}$ into the plane defined by the position in the main scanning direction and the position in the sub scanning direction of each of the reading lines $L_{00}$, $L_{01}$, $L_{02}$, $L_{03}$, and $L_{04}$ according to the corrected read value deviation characteristic, and may correct the pixel value of each pixel included in the overlay image information 131 using the developed correction value. In this case, the correcting unit 72C calculates the amount of deviation in the main scanning direction and the amount of deviation in the sub scanning direction between the correction value graph for the reading line $L_{00}$ and the correction value graph for each of the reading lines $L_{01}$, $L_{02}$, $L_{03}$, and $L_{04}$, and specifies the corrected read value deviation characteristic, that is, the amplitude ratio and the phase difference based on the calculated result. Then, the correcting unit 72C develops the correction value graph for the reading line $L_{00}$ at each position of the reading lines $L_{01}$, $L_{02}$, $L_{03}$, and $L_{04}$ in the main scanning direction according to the specified corrected read value deviation characteristic. Further, the correcting unit 72C develops the correction value graph for the reading line $L_{00}$ and each obtained correction value graph developed at each position of the reading lines $L_{01}$, $L_{02}$, $L_{03}$, and $L_{04}$ in the main scanning direction into multiple divided areas other than the reading lines $L_{00}$, $L_{01}$, $L_{02}$, $L_{03}$, and $L_{04}$ using an interpolation method (for example, linear interpolation). The correcting unit 72C may correct the pixel value of each pixel included in the overlay image information 131 using the correction value graph developed in the multiple divided areas. Meanwhile, the "correction value indicated by the correction value graph for the reading line $L_{00}$" is an example of a "correction value based on a corrected read value derived for a reference divided area among multiple divided areas" according to the technology of the present disclosure.

Further, a mode in which the creating unit 72B creates the reference white image read value integration graph by integrating the reference white image read values for plural cycles into that for one cycle has been described in the above exemplary embodiment by way of example, but the technology of the present disclosure is not limited thereto. For example, instead of the reference white image read value integration graph, a graph of any one of the reference white image read values for plural cycles may be used.

Further, a mode in which the correction value is developed using linear interpolation has been described in the above exemplar) embodiment by way of example, but the technology of the present disclosure is not limited thereto. For example, the correction value may be developed using non-linear interpolation.

Further, the white paper P has been illustrated in the above exemplary embodiment, but the technology of the present disclosure is not limited thereto. For example, instead of the paper P, another recording medium such as paper of a color other than white, a transparent sheet, or a translucent sheet may be applied.

Further, the xerography image forming apparatus 50 has been illustrated in the above exemplary embodiment, but the technology of the present disclosure is not limited thereto. For example, instead of the image forming apparatus 50, any of various image forming apparatuses such as an inkjet image forming apparatus, a thermal image forming apparatus, or a magnetographic image forming apparatus may be applied.

Further, in the above exemplary embodiment, the read value correction information 132 is correction information in a table format, but the technology of the present disclosure is not limited thereto, and the read value correction information 132 may be realized by an arithmetic expression. In this case, for example, the read value correction information 132 may be defined by an arithmetic expression in which the base image read value and the white image read value are independent variables and the corrected read value is a dependent variable.

Further, in the above exemplary embodiment, the in-plane density unevenness correction information 134 is correction information in a table format, but the technology of the present disclosure is not limited thereto, and the in-plane density unevenness correction information 134 may be realized by an arithmetic expression. In this case, for example, the in-plane density unevenness correction information 134 may be defined by an arithmetic expression in which the information specifying the position in the main scanning direction and the information specifying the position in the sub scanning direction are independent variables and the correction value is a dependent variable.

Further, in the above exemplary embodiment, the base image 110 is a black image and the image to be additionally printed on the base image 110 is a white image, but the technology of the present disclosure is not limited thereto, and the base image 110 and the image to be additionally printed may have different colors.

Further, a mode in which an image is transferred from the intermediate transfer belt 16 to the paper P has been described in the above exemplary embodiment by way of example, but the technology of the present disclosure is not limited thereto. For example, an image may be formed directly on the paper P from a cylindrical member such as the photoconductor drum 11. Meanwhile, in this case, the cylindrical member such as the photoconductor drum 11 is an example of a "transfer member" according to the technology of the present disclosure.

Figure 17:
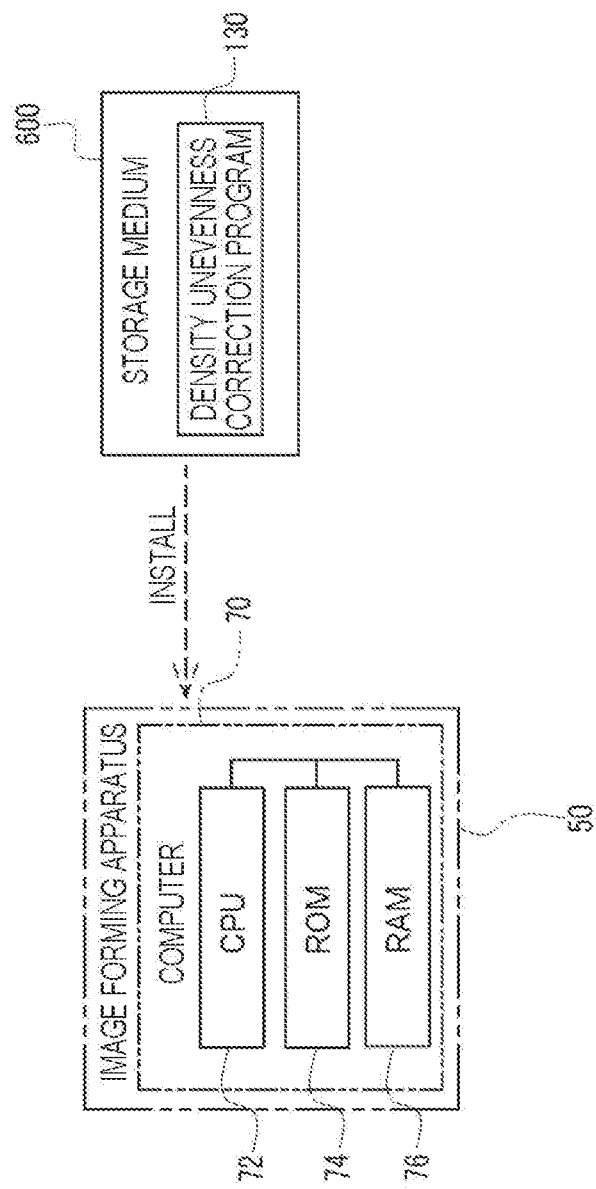
FIG. 17 is a conceptual diagram illustrating an example of an aspect in which a density unevenness correction program is installed into a computer in the image forming apparatus from a storage medium storing the density unevenness correction program according to the exemplary embodiment.

Further, a mode in which the density unevenness correction program 130 is stored in the ROM 74 has been described in the above exemplary embodiment by way of example, but the technology of the present disclosure is not limited thereto. For example, as illustrated in FIG. 17, the density unevenness correction program 130 may be stored in a storage medium 600. In this case, the density unevenness correction program 130 stored in the storage medium 600 is installed in the computer 70, and the CPU 72 executes the above-described image processing according to the density unevenness correction program 130.

In the example illustrated in the above exemplary embodiment, the CPU 72 is a single CPU, but the technology of the present disclosure is not limited thereto, and plural CPUs may be adopted, a GPU may be adopted, or at least one CPU and at least one GPU may be used together. Meanwhile, as an example of the storage medium 600, any portable storage medium such as a CD-ROM, a DVD-ROM, an SSD, or a USB memory may be mentioned.

In addition, the density unevenness correction program 130 may be stored in a storage unit such as another computer or a server device connected to the computer 70 via a communication network (not illustrated), and the density unevenness correction program 130 may be downloaded to the computer 70 response to a request of the image forming apparatus 50. In this case, the downloaded density unevenness correction program 130 is installed in the computer 70 and is executed by the CPU 72 of the computer 70.

Further, a mode realized by a software configuration of the computer 70 as the receiver 72A, the creating unit 72B, the correcting unit 72C, and the controller 72D (hereinafter referred to as "each unit described in the above exemplary embodiment") has been described in the above exemplary embodiment by way of example, but the technology of the present disclosure is not limited thereto. For example, each unit described in the above exemplary embodiment may be realized by a device including at least one of an ASIC, an FPGA, a PLD, or the like. Further, each unit described in the above exemplary embodiment may be realized by a combination of a hardware configuration and a software configuration.

The following various types of processors may be used as a hardware resource which executes the above-mentioned density unevenness correction process. The processor may be, for example, a CPU which is a general-purpose processor functioning as a hardware resource which executes the density unevenness correction process by executing software, that is, a program, as described above. Further, the processor may be, for example, a dedicated electric circuit which is a processor having a circuit configuration specially designed to execute a specific process such as FPGA, PLD, or ASIC.

The hardware resource which executes the density unevenness correction process may be configured with one of these various types of processors, or may be configured with a combination of two or more processors of the same type or different types (for example, a combination of plural FPGAs, or a combination of a CPU and an FPGA). Further, the hardware resource which executes the density unevenness correction process may be one processor.

As an example in which the hardware resource is configured with one processor, there is a first mode in which one processor is configured with a combination of one or more CPUs and software, typified by a computer of a client or a server, for example, and this processor functions as a hardware resource which performs a process of each unit described in the above exemplary embodiment. There is a second mode using a processor in which functions of the entire system including plural hardware resources which execute the density unevenness correction process are realized with one IC as typified by an SoC and the like. As described above, the process of each unit described in the above exemplary embodiment is realized using one or more of the above-described various processors as a hardware resource.

Furthermore, as a hardware-like structure of these various processors, more specifically, an electric circuit in which circuit elements such as semiconductor elements are combined may be used.

Further, the above-described density unevenness correction process is merely an example. Thus, needless to say, unnecessary steps may be deleted, new steps may be added, or the process order may be changed without departing from the scope of the present disclosure.

The description and illustration given above are detailed descriptions of portions according to the technology of the present disclosure and are merely examples of the technology of the present disclosure. For example, the above description related to the configurations, functions, actions, and effects is a description related to an example of the configurations, functions, actions, and effects of the portions according to the technology of the present disclosure. Thus, with respect to the description and illustration given above, unnecessary portions may be deleted, or new elements may be added or replaced without departing from the spirit of the technology of the present disclosure. Further, needless to say, in order to avoid confusion and facilitate the understanding of the portions according to the technology of the present disclosure, a description related to a technical common sense, for example, which is not particularly required to enable implementation of the technology of the present disclosure, is omitted in the description and illustration given above.

All documents, patent applications and technical standards described herein are incorporated by reference to the extent that each of the documents, patent applications and technical standards is specifically incorporated and to the same extent as recorded.

The following supplementary notes will be disclosed regarding the above exemplary embodiment.

(Supplementary Note 1)

An image forming apparatus including an image forming unit that forms an image by applying a first color to a first area in which in-plane density unevenness is confirmable within a recording medium and applying a second color different from the first color to a second area that is substantially the same as the first area in a superimposed manner, a reader that reads the first color from the first area and reads the second color from the second area, and a correcting unit that corrects in-plane density unevenness of the second color applied to the first color in the superimposed manner based on a first read value indicating a result of the reading by the reader and a second read value indicating a result of the reading by the reader.

(Supplementary Note 2)

The image forming apparatus described in Supplementary Note 1 in which the correcting unit derives a corrected read value obtained by removing influence of the first color from the second read value based on the first read value and the second read value, and corrects the in-plane density unevenness of the second color applied to the first color in the superimposed manner based on the derived corrected read value.

(Supplementary Note 3)

The image forming apparatus described in Supplementary Note 2 in which the correcting unit derives the corrected read value corresponding to the read result in the reader using a correspondence relationship among the first read value, the second read value, and the corrected read value.

(Supplementary Note 4)

The image forming apparatus described in Supplementary Note 3 in which the reader reads, along a sub scanning direction, the second color of each of multiple divided areas obtained by dividing the second area along a main scanning direction and in which the correcting unit derives the corrected read value corresponding to the read result for each of the multiple divided areas.

(Supplementary Note 5)

The image forming apparatus described in Supplementary Note 4 in which the correcting unit corrects the in-plane density unevenness of the second color using a correction value based on the corrected read value derived for each of the multiple divided areas.

(Supplementary Note 6)

The image forming apparatus described in Supplementary Note 5 in which the correcting unit develops the correction value in a plane defined by a position in the main scanning direction and a position in the sub scanning direction of each of the multiple divided areas, and corrects the in-plane density unevenness of the second color using the developed correction value.

(Supplementary Note 7)

The image forming apparatus described in Supplementary Note 6 in which the correcting unit develops the correction value for each of the multiple divided areas in the main scanning direction by an interpolation method.

(Supplementary Note 8)

The image forming apparatus described in Supplementary Note 6 in which the correcting unit develops the correction value based on the corrected read value derived for a reference divided area among the multiple divided areas in a plane defined by a position in the main scanning direction and a position in the sub scanning direction of each of the multiple divided areas according to a deviation characteristic between the corrected read values for the multiple divided areas, and corrects the in-plane density unevenness of the second color using the developed correction value.

(Supplementary Note 9)

The image forming apparatus described in Supplementary Note 8 in which the correcting unit develops the correction value for each of the multiple divided areas according to the characteristic, and develops the correction value developed for each of the multiple divided areas in the main scanning direction by an interpolation method.

(Supplementary Note 10)

The image forming apparatus described in Supplementary Note 6 in which the image forming unit includes a transfer member that transfers the first color and the second color to the recording medium by circulating in the sub scanning direction, in which the reader reads the second color from a reference image of the second color formed on the transfer member along the sub scanning direction, and in which the correcting unit develops a correction value based on a third read value indicating a result of reading the second color of the reference image along the sub scanning direction by the reader in a plane defined by a position in the main scanning direction and a position in the sub scanning direction of each of the multiple divided areas according to a deviation characteristic between the corrected read values for the multiple divided areas, and corrects the in-plane density unevenness of the second color using the developed correction value.

(Supplementary Note 11)

The image forming apparatus described in Supplementary Note 10 in which the third read value is a read value indicating the result of reading the second color along the sub scanning direction by the reader from an image area for one cycle in the sub scanning direction of the reference image by the transfer member.

(Supplementary Note 12)

The image forming apparatus described in Supplementary Note 10 in which the third read value is a value obtained by adding the results of reading the second color along the sub scanning direction by the reader from the image area for plural cycles in the sub scanning direction of the reference image by the transfer member and averaging the results for one cycle.

(Supplementary Note 13)

The image forming apparatus described in any one of Supplementary Notes 10 to 12 in which the transfer member is a belt-shaped member that circulates in the sub scanning direction.

(Supplementary Note 14)

The image forming apparatus described in any one of Supplementary Notes 10 to 13 in which the correcting unit develops the correction value for each of the multiple divided areas according to the characteristic, and develops the correction value developed for each of the multiple divided areas in the main scanning direction by an interpolation method.

(Supplementary Note 15)

The image forming apparatus described in any one of Supplementary Notes 10 to 14 in which the characteristic is defined using an amplitude ratio of the corrected read values between the multiple divided areas.

(Supplementary Note 16)

The image forming apparatus described in Supplementary Note 15 in which the amplitude ratio is obtained by performing discrete Fourier transform on the corrected read value for each of the multiple divided areas.

(Supplementary Note 17)

The image forming apparatus described in any one of Supplementary Notes 10 to 16 in which the characteristic is defined using a phase difference of the corrected read values between the multiple divided areas.

(Supplementary Note 18)

The image forming apparatus described in Supplementary Note 17 in which the phase difference is obtained by performing discrete Fourier transform on the corrected read value for each of the multiple divided areas.

(Supplementary Note 19)

The image forming apparatus described in any one of Supplementary Notes 5 to 18 in which the correction value is defined by an inverse function of a function that indicates correlation between the corrected read value and the position in the sub scanning direction.

(Supplementary Note 20)

The image forming apparatus described in any one of Supplementary Notes 1 to 19 in which the first color is black and the second color is white.

(Supplementary Note 21)

A program causing a computer used for an image forming apparatus, the image forming apparatus including an image forming unit that forms an image by applying a first color to a first area in which in-plane density unevenness is confirmable within a recording medium and applying a second color different from the first color to a second area that is substantially the same as the first area in a superimposed manner and a reader that reads the first color from the first area and reads the second color from the second area, to function as a correcting unit that corrects in-plane density unevenness of the second color applied to the first color in a superimposed manner based on a first read value indicating a result of the reading by the reader and a second read value indicating a result of the reading by the reader.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   at least one processor configured to implement:
      a receiver configured to receive:
         a first read value indicating a result of reading a first color by a reader from a recording medium in which the first color is applied to a first area in which in-plane density unevenness is confirmable within the recording medium,
            wherein the reader comprises at least one sensor; and
         a second read value indicating a result of reading a second color by the reader, the second color being different from the first color and being applied to a second area that is substantially the same as the first area in a superimposed manner; and
      a correcting unit configured to correct in-plane density unevenness of the second color applied to the first color in the superimposed manner using the first read value received by the receiver and the second read value received by the receiver.

2. The image processing apparatus according to claim 1, wherein the correcting unit is configured to derive a corrected read value obtained by removing influence of the first color from the second read value using the first read value and the second read value, and
   wherein the correcting unit is configured to correct the in-plane density unevenness of the second color applied to the first color in the superimposed manner using the derived corrected read value.

3. The image processing apparatus according to claim 2, wherein the correcting unit is configured to derive the corrected read value corresponding to a receiving result from the receiver using a correspondence relationship among the first read value, the second read value, and the corrected read value.

4. The image processing apparatus according to claim 3, wherein the reader is configured to read, along a sub scanning direction, the second color of each of multiple divided areas obtained by dividing the second area along a main scanning direction, and
   wherein the correcting unit is configured to derive the corrected read value corresponding to the receiving result for each of the multiple divided areas.

5. The image processing apparatus according to claim 1, wherein the first color is black, and
   wherein the second color is white.

6. An image forming apparatus comprising:
   an image forming unit comprising:
      a light source;
      a charger;
      a developing roller;
      a photoconductor drum;
      a transfer belt;
      a secondary transfer roller; and
      a backup roller;
      wherein the image forming unit is configured to form an image by operations comprising:
         applying a first color to a first area in which in-plane density unevenness is confirmable within a recording medium; and
         applying a second color different from the first color to a second area that is substantially the same as the first area in a superimposed manner;
   a reader comprising at least one sensor:
      wherein the reader is configured to read the first color from the first area resulting in a first read value,
      wherein the reader is configured to read the second color from the second area resulting in a second read value; and
   at least one processor configured to implement a correcting unit configured to correct in-plane density unevenness of the second color applied to the first color in the superimposed manner using the first read value and the second read value.

7. The image forming apparatus according to claim 6, wherein the correcting unit is configured to derive a corrected read value obtained by removing influence of the first color from the second read value using the first read value and the second read value, and
wherein the correcting unit is configured to correct the in-plane density unevenness of the second color applied to the first color in the superimposed manner using the derived corrected read value.

8. The image forming apparatus according to claim 7, wherein the correcting unit is configured to derive the corrected read value corresponding to a read result of the reader using a correspondence relationship among the first read value, the second read value, and the corrected read value.

9. The image forming apparatus according to claim 8, wherein the reader is configured to read, along a sub scanning direction, the second color of each of multiple divided areas obtained by dividing the second area along a main scanning direction, and
wherein the correcting unit is configured to derive the corrected read value corresponding to the read result for each of the multiple divided areas.

10. The image forming apparatus according to claim 9, wherein the correcting unit is configured to correct the in-plane density unevenness of the second color using a correction value using the corrected read value derived for each of the multiple divided areas.

11. The image forming apparatus according to claim 10, wherein the image forming unit comprises a transfer member configured to transfer the first color and the second color to the recording medium by circulating in the sub scanning direction,
wherein the at least one sensor comprises a first sensor and a second sensor,
wherein the second sensor is configured to read the second color from a reference image of the second color formed on the transfer member along the sub scanning direction,
wherein the correcting unit is configured to develop a correction value using a third read value indicating a result of reading the second color of the reference image along the sub scanning direction by the second sensor in a plane defined by a position in the main scanning direction and a position in the sub scanning direction of each of the multiple divided areas according to a deviation characteristic between the corrected read values for the multiple divided areas, and
wherein the correcting unit is configured to correct the in-plane density unevenness of the second color using the developed correction value.

12. The image forming apparatus according to claim 11, wherein the third read value is a read value indicating the result of reading the second color along the sub scanning direction by the second sensor from an image area for one cycle in the sub scanning direction of the reference image by the transfer member.

13. The image forming apparatus according to claim 11, wherein the third read value is a value obtained by adding the results of reading the second color along the sub scanning direction by the second sensor from the image area for plural cycles in the sub scanning direction of the reference image by the transfer member and averaging the results for one cycle.

14. The image forming apparatus according to claim 11, wherein the transfer member comprises a belt-shaped member configured to circulate in the sub scanning direction.

15. The image forming apparatus according to claim 11, wherein the correcting unit is configured to develop the correction value for each of the multiple divided areas according to the characteristic, and
wherein the correcting unit is configured to develop the correction value developed for each of the multiple divided areas in the main scanning direction by an interpolation method.

16. A non-transitory computer readable medium storing a program that, if executed, causes a computer to execute image processing, the image processing comprising:
receiving, by a receiver, values comprising:
a first read value indicating a result of reading a first color by a reader from a recording medium in which the first color is applied to a first area in which in-plane density unevenness is confirmable within the recording medium,
wherein the reader comprises at least one sensor; and
a second read value indicating a result of reading a second color by the reader, the second color being different from the first color and being applied to a second area that is substantially the same as the first area in a superimposed manner; and
correcting in-plane density unevenness of the second color applied to the first color in the superimposed manner using the first read value received by the receiver and the second read value received by the receiver.

* * * * *